US007652671B2

(12) United States Patent
Nagao et al.

(10) Patent No.: US 7,652,671 B2
(45) Date of Patent: Jan. 26, 2010

(54) IMAGE PROCESSING DEVICE AND METHOD AND STORAGE MEDIUM STORING PROGRAM

(75) Inventors: Takashi Nagao, Ashigarakami-gun (JP); Yukio Kumazawa, Ashigarakami-gun (JP); Youichi Isaka, Ashigarakami-gun (JP); Takashi Igarashi, Shinagawa-ku (JP); Yusuke Sugimoto, Shinagawa-ku (JP); Kazuyuki Itagaki, Shinagawa-ku (JP); Junichi Kaneko, Kawasaki (JP)

(73) Assignees: Fuji Xerox Co., Ltd., Tokyo (JP); Fujifilm Corporation, Tokyo (JP)

( * ) Notice: Subject to any disclaimer, the term of this patent is extended or adjusted under 35 U.S.C. 154(b) by 629 days.

(21) Appl. No.: 11/637,721

(22) Filed: Dec. 13, 2006

(65) Prior Publication Data

US 2008/0001953 A1 Jan. 3, 2008

(30) Foreign Application Priority Data

Jun. 29, 2006 (JP) ............................ 2006-179258

(51) Int. Cl.
*G06T 1/20* (2006.01)

(52) U.S. Cl. ........................................ 345/506; 712/32

(58) Field of Classification Search ................. 345/505, 345/506; 712/32
See application file for complete search history.

(56) References Cited

U.S. PATENT DOCUMENTS

| | | | | |
|---|---|---|---|---|
| 5,289,577 | A * | 2/1994 | Gonzales et al. | 345/506 |
| 5,450,599 | A * | 9/1995 | Horvath et al. | 382/233 |
| 5,594,854 | A * | 1/1997 | Baldwin et al. | 345/441 |
| 7,565,287 | B2 * | 7/2009 | Sadri et al. | 704/221 |
| 2005/0179695 | A1 * | 8/2005 | Saito et al. | 345/582 |

FOREIGN PATENT DOCUMENTS

| | | |
|---|---|---|
| JP | A 5-260373 | 10/1993 |
| JP | A 2004-287833 | 10/2004 |

* cited by examiner

*Primary Examiner*—Kee M Tung
*Assistant Examiner*—Robert Craddock
(74) *Attorney, Agent, or Firm*—Oliff & Berridge, PLC

(57) ABSTRACT

An image processing device including a storage section, a parallel processing controller, a sequential processing controller, and a selection section which selectively operates the two control sections. The parallel processing controller connects one or more of the image processing modules such that first buffer modules are connected at least one of preceding and following each image processing module, to formulate a first image processing section, and controls such that individual image processing modules perform image processing in parallel with one another. The first buffer modules perform exclusive access control. The sequential processing controller connects one or more of the image processing modules such that second buffer modules are connected at least one of preceding and following each image processing module, to formulate a second image processing section, and controls such that the individual image processing modules perform image processing sequentially. The second buffer modules do not perform exclusive access control.

21 Claims, 15 Drawing Sheets

F I G. 1
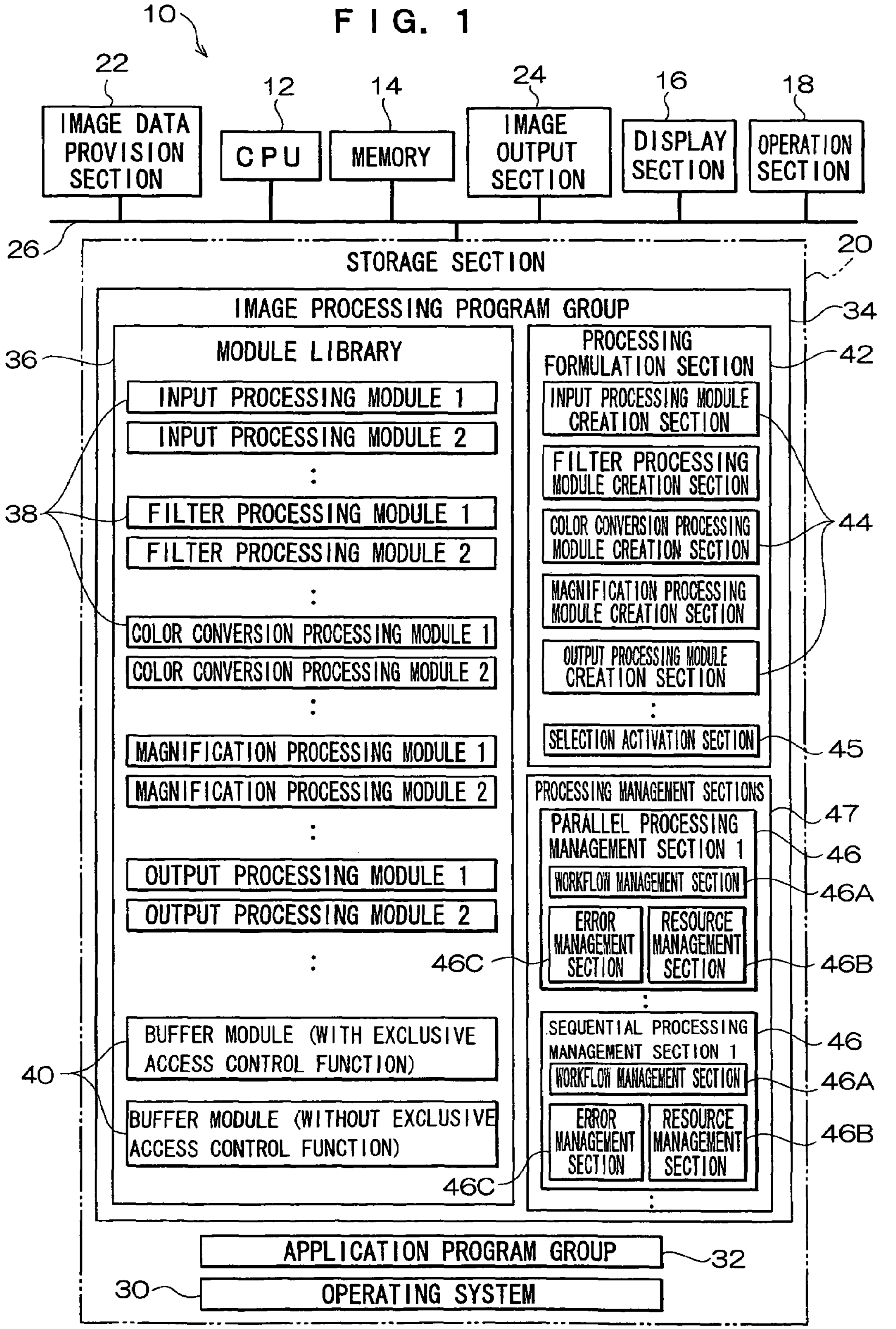

STRUCTURAL EXAMPLES OF IMAGE PROCESSING SECTION

F I G. 4A
GENERAL STRUCTURE AND PROCESSING OF IMAGE PROCESSING MODULE
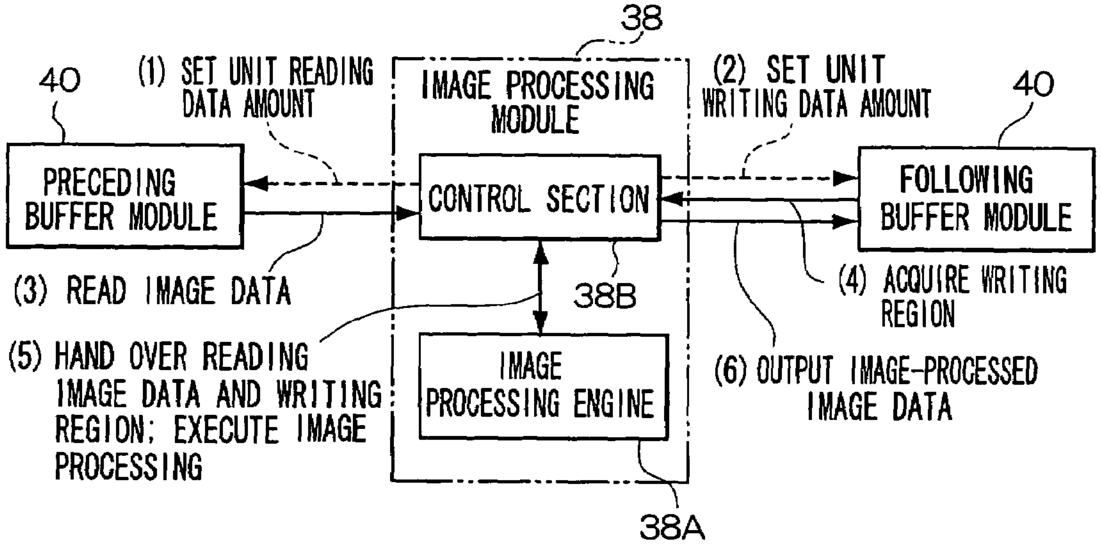
F I G. 4B
GENERAL STRUCTURE AND PROCESSING OF BUFFER MODULE (WHEN IMAGE DATA REQUESTED BY THE FOLLOWING STAGE IS NOT STORED IN THE BUFFER)
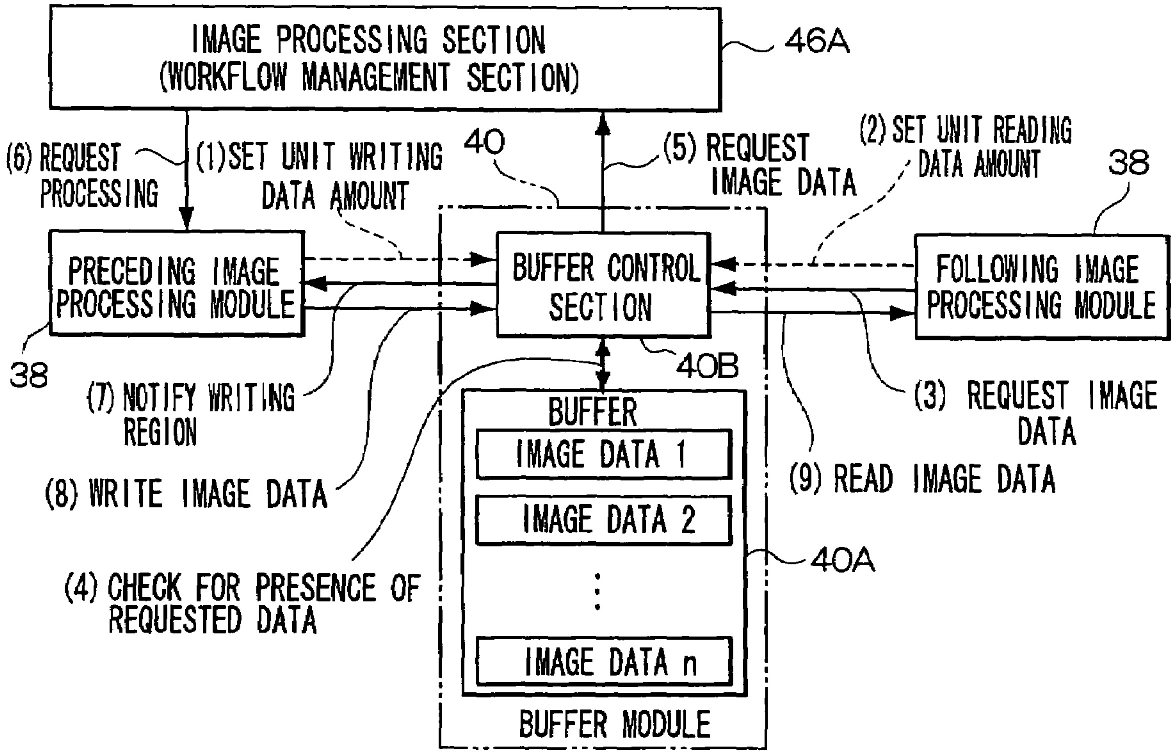

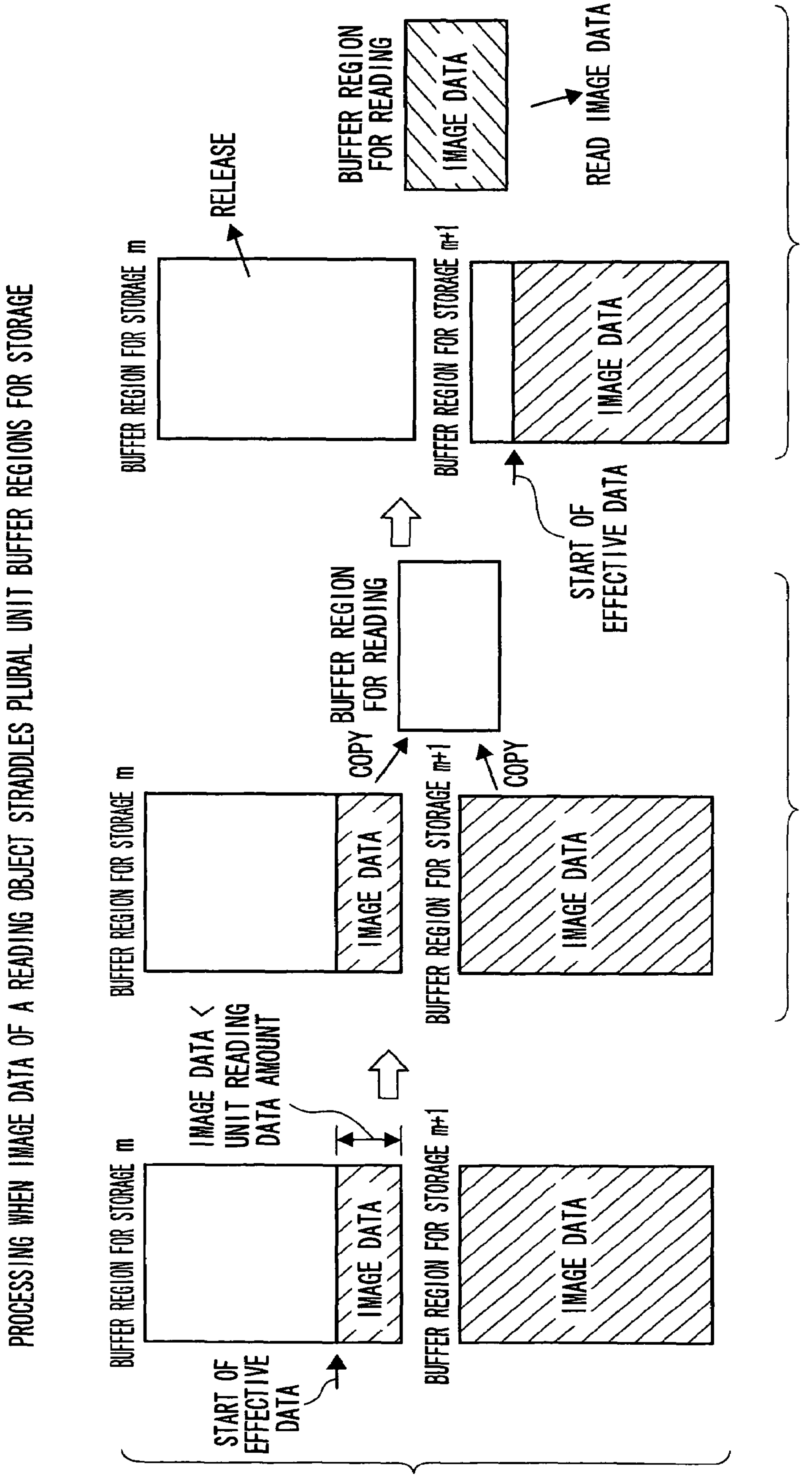
F I G. 6A
F I G. 6B
F I G. 6C

F I G. 7
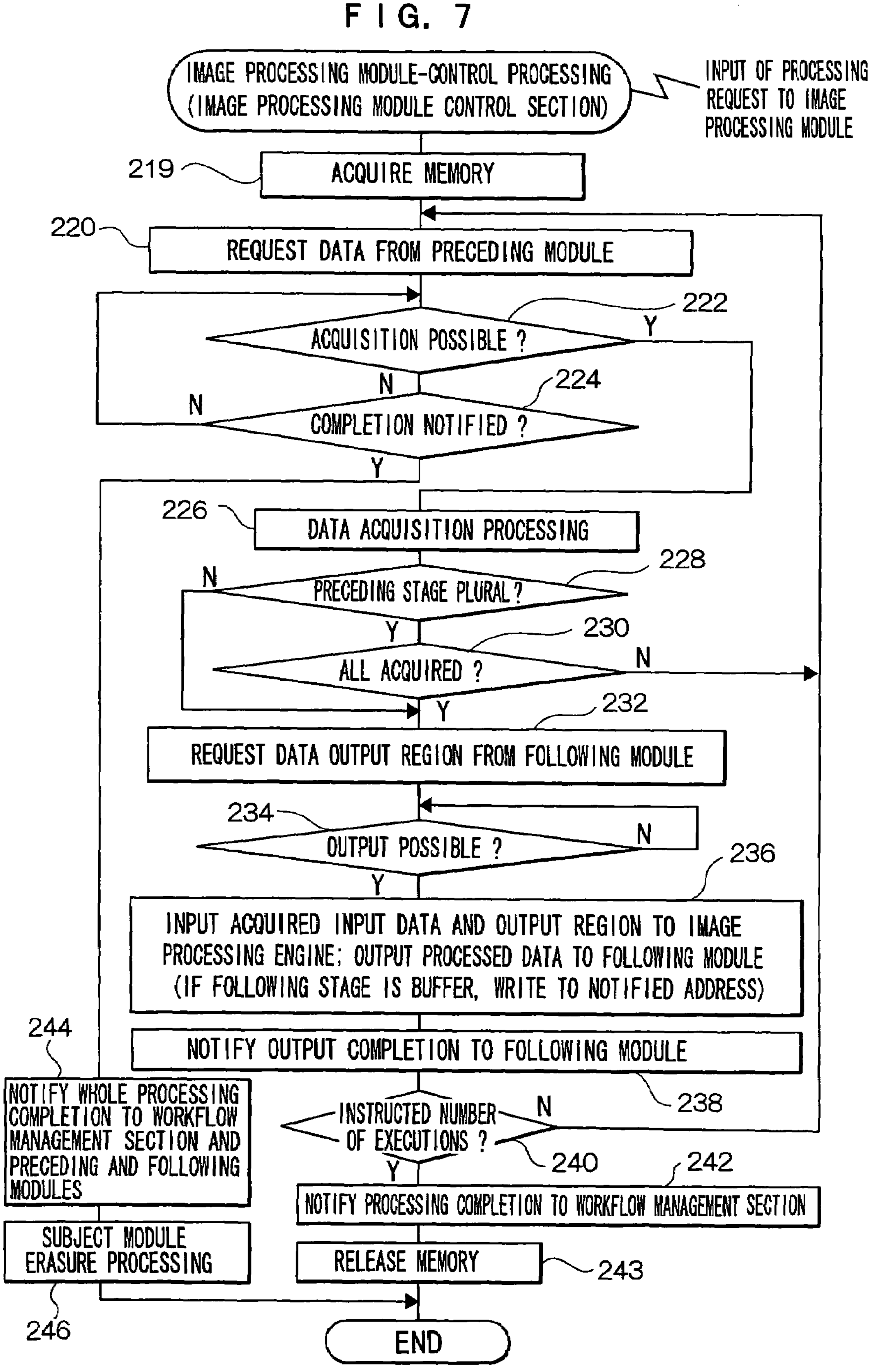

MIDDLE VALUE
EXECUTION PRIORITY
← PRECEDING
FOLLOWING →
MODULE POSITION
INITIAL SETTINGS

MIDDLE VALUE
EXECUTION PRIORITY
MODULE POSITION
PROGRESS 50%

MIDDLE VALUE
EXECUTION PRIORITY
MODULE POSITION
PROGRESS 90%+

MIDDLE VALUE
EXECUTION PRIORITY
MODULE POSITION
PROGRESS 50%

MIDDLE VALUE
EXECUTION PRIORITY
MODULE POSITION
PROGRESS 90%+

F I G. 14A
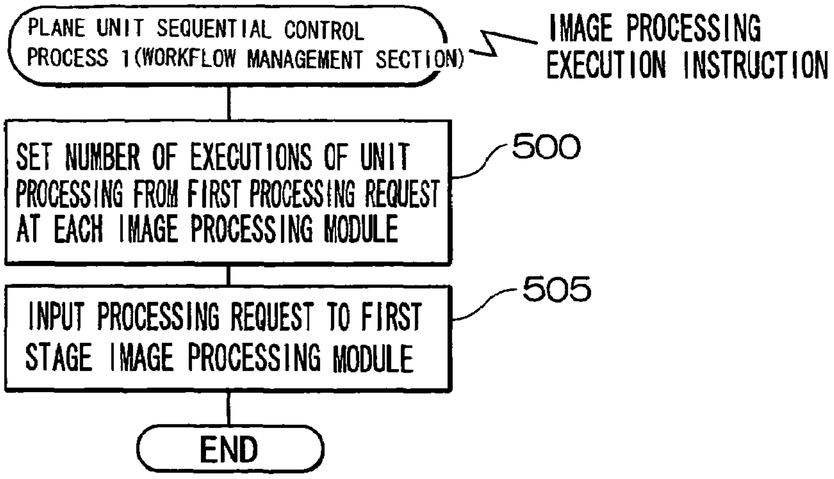
F I G. 14B
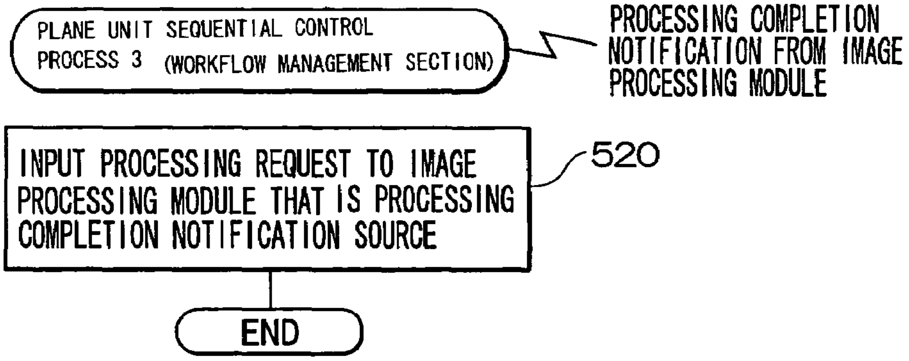
F I G. 14C
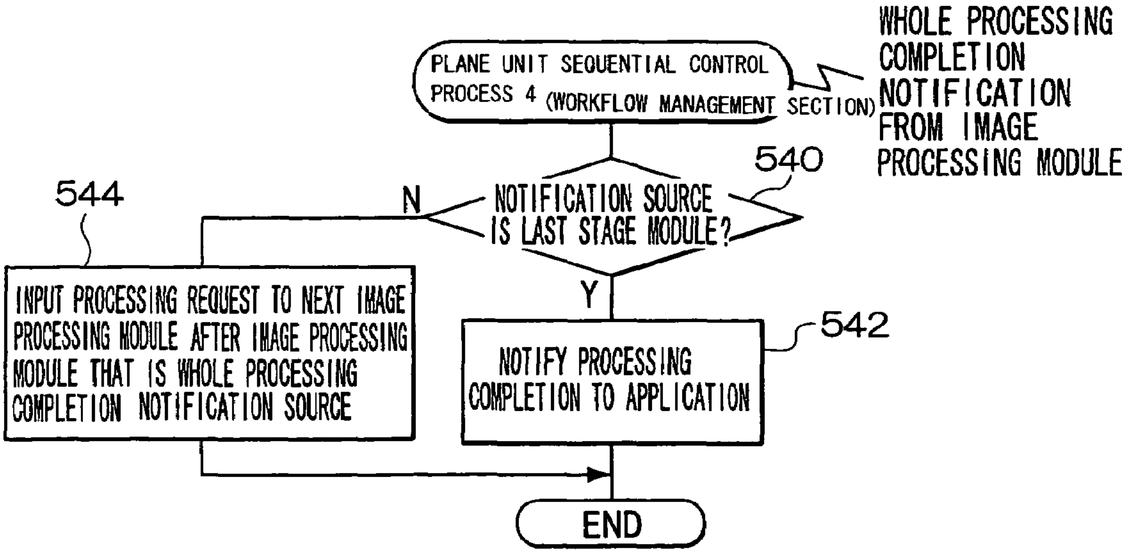

IMAGE PROCESSING DEVICE AND METHOD AND STORAGE MEDIUM STORING PROGRAM

BACKGROUND

1. Technical Field

The present invention relates to an image processing device and method, and a storage medium storing a program, and more particularly relates to an image processing device which is provided with an image processing section formed by connecting individual modules in a pipeline form or a directed acyclic graph form, such that buffer modules are connected at least one of preceding and following image processing modules, and an image processing method and a storage medium storing an image processing program, which are for causing a computer to function as the image processing device.

2. Related Art

In an image processing device which carries out image processing on inputted image data, a DTP (desktop publishing) system which is capable of handling images, a printing system which records an image represented by inputted image data on a recording material, or the like, various kinds of image processing are carried out on the inputted image data, such as magnification/reduction, rotation, affine transformations, color conversions, filter processing, image synthesis and so forth. In such devices and systems, in cases in which categories of inputted image data and contents (details), sequencing, parameters and the like of image processing to be applied to the image data are fixed, the image processing can be carried out by specifically designed hardware. However, in a case in which different kinds of image data with, for example, different color spaces, bit counts per pixel or the like are to be inputted and/or the contents, sequencing and parameters and the like of the image processing are to be variously altered, a structure in which the image processing to be executed can be more flexibly altered is needed.

For execution of image processing, as processing systems for a case in which plural image processing modules are combined to formulate an image processing section and carry out desired image processing, a parallel processing system and a sequential processing system can be considered. The parallel processing system carries out image processing at the individual image processing modules in parallel, and the sequential processing system carries out image processing continually at single image processing modules and arranges a sequence of image processing modules which are to carry out the image processing. Of these systems, the parallel processing system is capable of a higher processing speed than the sequential processing system in an operating environment in which resources such as, for example, memory and the like are comparatively plentiful. On the other hand, the sequential processing system operates stably in an operating environment in which resources such as memory and the like are comparatively scarce. Because these processing methods have characteristics which differ from one another in this manner, it is desirable to be able to switch between the processing systems in consideration of various factors, such as configuration of the processing device, operation environment, interaction with other application programs that are being executed at the same time, and the like.

Enabling switching between parallel processing and sequential processing can be realized by, for example, respectively preparing a program for parallel processing and a program for sequential processing. However, in such a case, a workload of development of a program for causing a computer to function as an image processing device will increase. In particular, of the above-mentioned programs, for programs which functions as image processing modules, changes and additions, such as improvements of previous algorithms, additions of image processing modules which perform new image processes and the like, are performed with a comparatively high frequency. However, the respective preparation of a program for parallel processing and a program for sequential processing as programs of an image processing module leads to a very large increase in the workload of program development.

Making a program which is common for parallel processing and for sequential processing can be considered. However, parallel processing and sequential processing differ in that exclusive access control is not required for sequential processing but is necessary for parallel processing. Consequently, when a single common program is made for parallel processing and for sequential processing, unnecessary exclusive access control is applied to the sequential processing, and hence problems arise with reductions in processing speed, wasteful usage of resources and the like. Furthermore, with the parallel processing system, individual image processing modules may be operated as separate threads, and it is possible to rearrange execution priorities of the threads. However, in a case in which a program is a single common program for parallel processing and for sequential processing, it is difficult to perform control of execution priorities as described above during parallel processing.

SUMMARY

An aspect of the present invention is an image processing device including: a storage section that respectively stores programs of a plurality of types of image processing module, the programs each functioning as an image processing module that acquires image data from a preceding stage, carries out predetermined image processing on the image data and outputs to a following stage processed image data or a result of the processing, and the programs being different from one another in type or contents of the image processing; a parallel processing control section that selects at least one image processing module from the plurality of types of image processing module, formulates a first image processing section such that first buffer modules are connected preceding and/or following the selected image processing module(s), the modules being connected in a pipeline form or a directed acyclic graph form, and performs control such that image processing is carried out mutually in parallel by the respective image processing modules of the first image processing section, each first buffer module allowing writing of image data outputted from a preceding module to a buffer of the buffer module, allowing reading of the image data stored in the buffer by a following module, and performing exclusive access control with respect to access to the buffer; a sequential processing control section that selects at least one image processing module from the plurality of types of image processing module, formulates a second image processing section such that second buffer modules are connected preceding and/or following the selected image processing modules, the modules being connected in a pipeline form or a directed acyclic graph form, and performs control such that image processing is sequentially carried out by the individual image processing modules of the second image processing section, each second buffer module allowing writing of image data outputted from a preceding module to a buffer of the buffer module, allowing reading of the image data stored in the buffer by a following module, and not performing exclusive access control with respect to access to the buffer; and a selection section that selectively operates the parallel processing control section or the sequential processing control section, and causes image processing to be carried out on the image data of a processing object by the first image processing section or the second image processing section.

BRIEF DESCRIPTION OF THE DRAWINGS

An exemplary embodiment of the present invention will be described in detail based on the following figures, wherein:

FIG. 1 is a block diagram showing general structure of a computer (image processing device) relating to a exemplary embodiment;

FIG. 4A is a block diagram showing general structure and processing which is executed at an image processing module;

FIG. 4B is a block diagram showing general structure and processing which is executed at a buffer module;

FIGS. 6A, 6B and 6C are schematic diagrams describing a case in which image data of a reading object straddles plural unit buffer regions for storage;

FIG. 7 is a flowchart showing details of control processing of an image processing module, which is executed by a control section of the image processing module;

FIGS. 14A, 14B and 14C are flowcharts showing details of plane unit sequential control processing which is executed by a workflow management section of a sequential processing management section.

DETAILED DESCRIPTION

Figure 2:
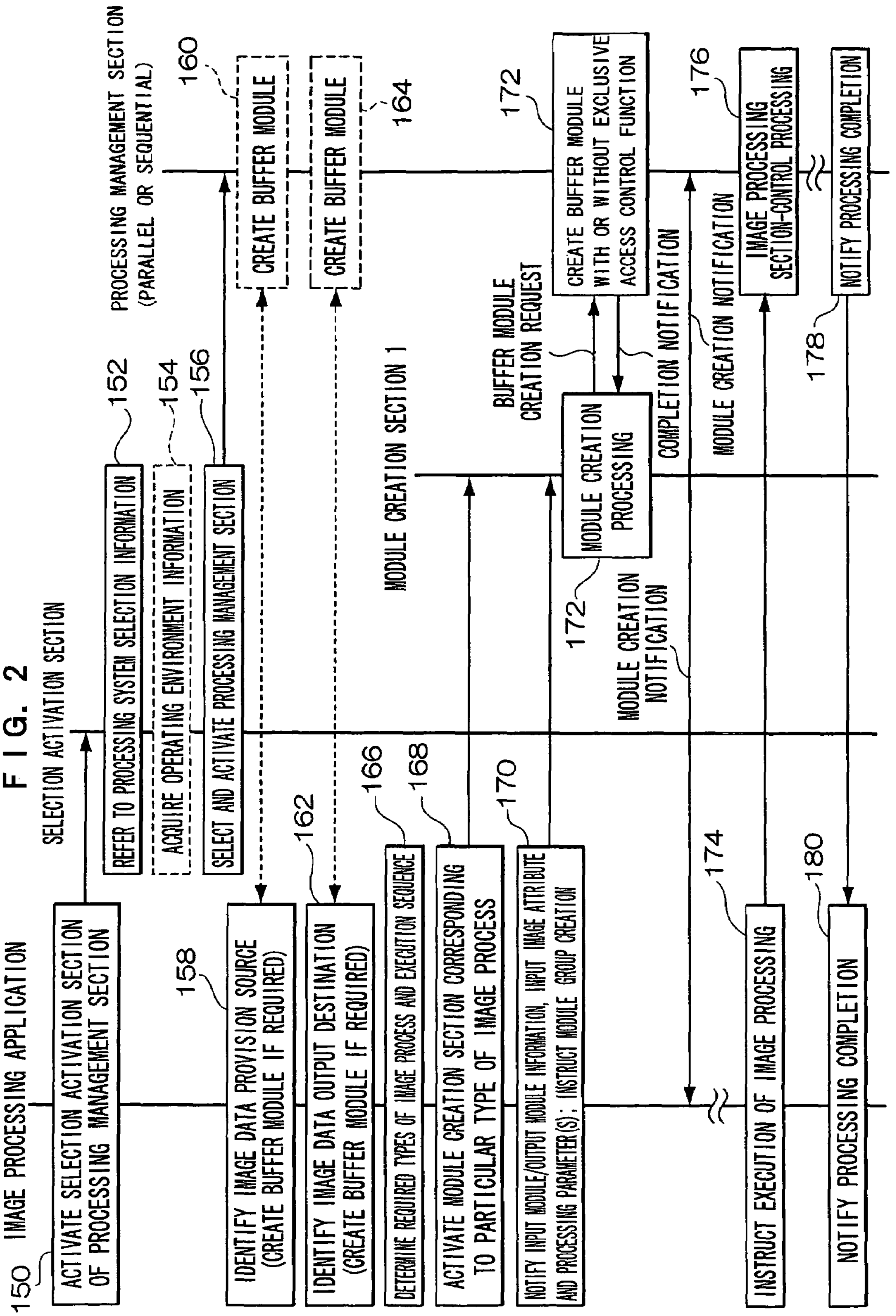
FIG. 2 is a sequence diagram for describing a sequence of processing from formulation of an image processing section until execution of image processing.

Herebelow, an exemplary embodiment of the present invention will be described in detail with reference to the drawings. FIG. 1 shows a computer 10 which is capable of functioning as an image processing device relating to the exemplary embodiment. This computer may be incorporated into an arbitrary image manipulation device inside which performance of image processing is required, such as a photocopier, a printer, a facsimile machine or a multifunction device combining these functions thereof, or a scanner, a photographic printer or the like. The computer 10 may also be a stand-alone computer such as a desktop computer (a PC) or the like, or a computer which is incorporated in a portable device such as a PDA (personal digital assistant), a portable telephony device or the like.

The computer 10 is provided with a CPU 12, memory 14, a display section 16, an operation section 18, a storage section 20, an image data provision section 22 and an image output section 24, and these are connected to each other by a bus 26. When the computer 10 is incorporated in an image manipulation device as described above, a display panel formed of an LCD or the like and a ten-key pad or the like which are provided at the image manipulation device can be used as the display section 16 and the operation section 18. If the computer 10 is a stand-alone computer, a display, a keyboard, a mouse and the like which are connected to the computer can be used as the display section 16 and the operation section 18. As the storage section 20, an HDD (hard disk drive) may be used. However, in place thereof, another non-volatile memory component such as a flash memory or the like may be used.

For the image data provision section 22, it is sufficient that it be capable of providing image data of objects of processing. For example: an image reading section which acquires an image recorded at a recording material such as paper, photographic film or the like and outputs the image data; a receiving section which receives the image data from outside through a communication lines; an image storage section which stores the image data (the memory 14 or the storage section 20); or the like can be used. For the image output section 24, it is sufficient that it outputs image data which has been image-processed or an image represented by this image data. For example: an image recording section which records the image represented by image data at a recording material such as paper, a photosensitive material or the like; a display section which displays the image represented by image data at a display screen or the like; a writing apparatus which writes the image data to a recording medium; or a transmission section which sends the image data through a communication line can be used. It is also acceptable for the image output section 24 to be an image storage section which stores the image-processed image data (the memory 14 or the storage section 20).

As shown in FIG. 1, as various programs to be executed by the CPU 12, a program of an operating system 30, an image processing program group 34 and programs of various applications 32 (labeled as application program group 32 in FIG. 1) are respectively stored in the storage section 20. The operating system 30 administers management of resources such as the memory 14 and the like, management of the execution of programs by the CPU 12, communications between the computer 10 and the outside, and the like. The image processing program group 34 is for causing the computer 10 to function as the image processing device relating to the exemplary embodiment. The applications 32 cause desired image processing to be carried out at the image processing device which is realized by the CPU 12 executing the above-mentioned image processing program group 34.

The image processing program group 34 corresponds to an image processing program is a program developed to be usable in common at various devices (platforms), such as various image manipulation devices, portable devices, PCs and the like. The image processing device which is realized by the image processing program group 34, in accordance with formulation instructions from one of the applications 32, formulates an image processing section which will carry out image processing instructed by the application 32, and in accordance with execution instructions from the application 32, carries out image processing with this image processing section (to be described in detail later). The image processing program group 34 provides the application 32 with an interface for instructing formulation of the image processing section to perform desired image processing (an image processing section with a desired structure), and/or instructing execution of image processing by the thus-formulated image processing section. Therefore, when an arbitrary device inside which the performance of image processing is required is being newly developed, for example, for the development of programs which perform image processing, it is sufficient just to develop the applications 32 so as to utilize the above-mentioned interface to cause image processing which is required at that device to be carried out. Thus, there is no need to newly develop the programs for actually carrying out image processing.

Further, the image processing device which is realized by the image processing program group 34 as described above formulates the image processing section, which is to carry out image processing that the application 32 instructs, in accordance with formulation instructions from the application 32, and performs image processing with the formulated image processing section. Therefore, even when, for example, a color space, a number of bits per pixel or the like of the image data of image processing objects is variable, or contents of image processes that are to be executed, or sequencing, parameters or the like are variable, the application 32 can instruct re-formulation of the image processing section, and image processing that is executed by the image processing device (image processing section) can be flexibly altered in accordance with image data of processing objects.

Figure 3A:
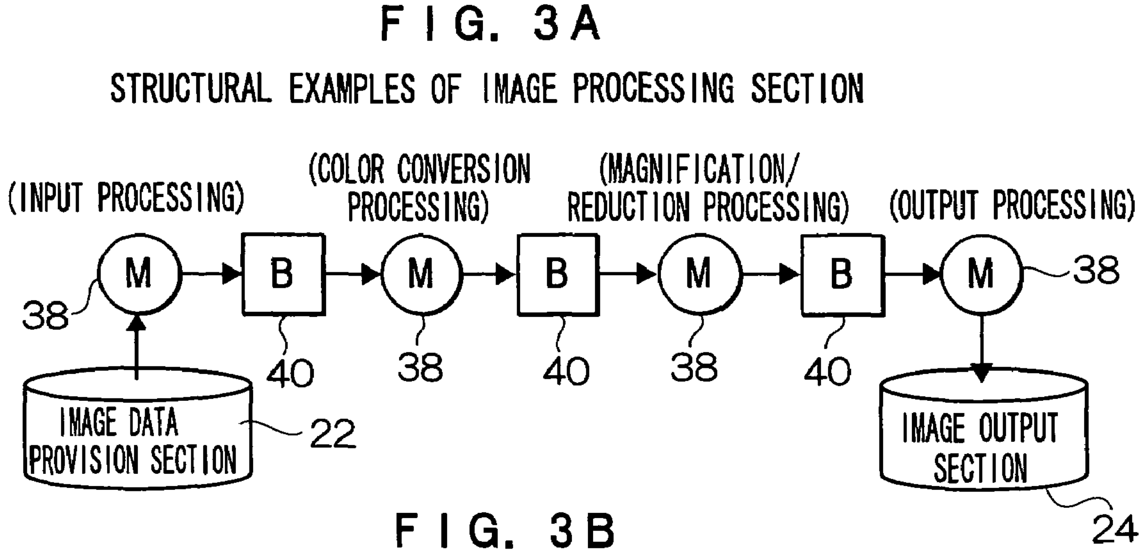
FIGS. 3A, 3B and 3C are block diagrams showing structural examples of the image processing section.
Figure 3B:
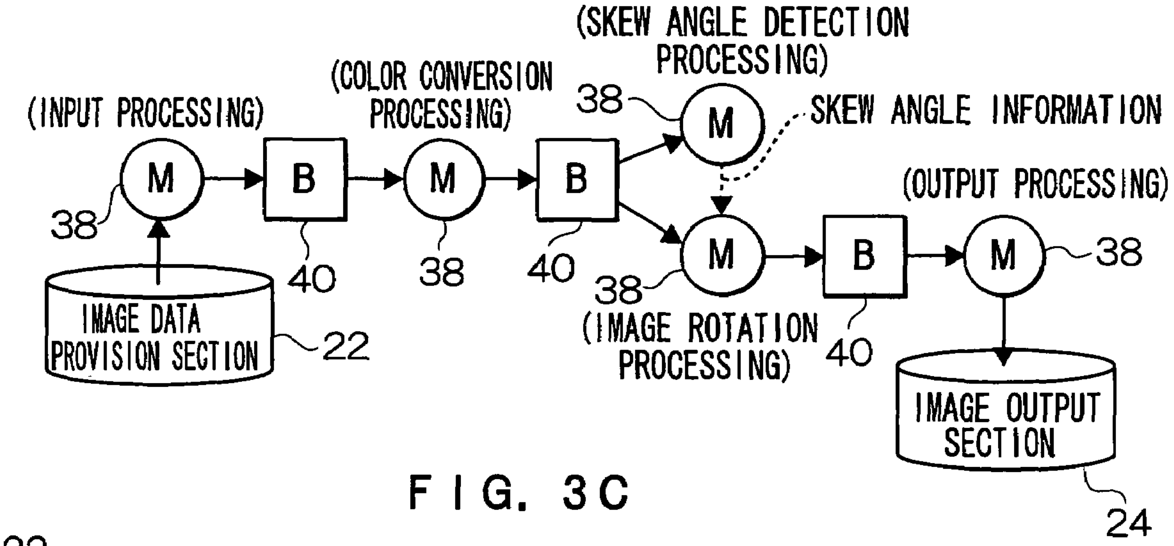

Now, the image processing program group 34 will be described. As shown in FIG. 1, the image processing program group 34 is broadly divided into a module library 36, programs of a processing formulation section 42, and a processing management section library 47. As will be described in more detail later, in accordance with instructions from an application, the processing formulation section 42 relating to the exemplary embodiment formulates an image processing section 50 which is constituted by connecting at least one image processing module 38 and buffer modules 40 in a pipeline form or a DAG (directed acyclic graph) form as shown in, for example, FIGS. 3A to 3B. The image processing modules 38 perform pre-specified image processing. The buffer modules 40 are arranged at least one of preceding and following the individual image processing modules 38, and are provided with buffers for storing image data. The substance of an individual image processing module which constitutes the image processing section 50 is a first program which is executed by the CPU 12 for causing predetermined image processing to be carried out at the CPU 12, or a second program which is executed by the CPU 12 for instructing execution of processing at an external image processing device which is not shown in FIG. 1 (for example, a dedicated image processing circuit board or the like). Plural types of programs of the image processing modules 38, which carry out mutually different pre-specified image processes (for example, input processing, filter processing, color conversion processing, magnification/reduction processing, skew angle detection processing, image rotation processing, image synthesis processing, output processing and the like) are registered in the above-mentioned module library 36. Hereafter, in order to simplify descriptions, substances of the individual image processing modules which constitute the image processing section 50 will be described as for the above-mentioned first program.

An individual image processing module 38 is structured with an image processing engine 38A and a control section 38B, as shown in, for example, FIG. 4A. The image processing engine 38A carries out an image process on image data in predetermined unit processing data amount units. The control section 38B performs input and output of image data to and from image processing modules 38 at preceding and following stages, and control of the image processing engine 38A. The unit processing data amount at the individual image processing module 38 may be selected and specified in advance from arbitrary numbers of bytes, such as an amount corresponding to a single line of an image, an amount corresponding to plural lines of an image, an amount corresponding to a single pixel of an image, an amount corresponding to a single plane of an image, or the like, in accordance with the type of image processing that the image processing module 38 is to carry out. For example, with the image processing module 38 carrying out color conversion processing, or filter process, the unit processing data amount may be set to a single pixel amount. With the image processing module 38 carrying out magnification/reduction processing, the unit processing data amount may be set to a single line amount of the image or a plural lines amount of the image. With the image processing module 38 carrying out image rotation processing, the unit processing data amount may be set to an image single plane amount. With the image processing module 38 carrying out compression/decompression processing, the unit processing data amount may be set to N bytes, depending on conditions of execution.

Image processing modules 38 in which types of image processing that the image processing engines 38A are to execute are the same but contents (details) of the image processing to be executed are different are also registered in the module library 36. In FIG. 1, image processing modules of this type are labeled with "module 1" and "module 2". For example, for image processing modules 38 which carry out magnification/reduction processing, the plural image processing modules 38 are respectively prepared, such as an image processing module 38 which carries out reduction processing which reduces to 50% by thinning out alternate pixels from inputted image data, an image processing module 38 which carries out magnification/reduction processing to a magnification/reduction ratio which is designated for the inputted image data, and suchlike. As a further example, for image processing modules 38 which carry out color conversion processing, an image processing module 38 which converts from an RGB color space to a CMY color space, an image processing module 38 which converts in the opposite direction, and image processing modules 38 which perform other color space conversions, such as to/from the L*a*b* color space or the like, are respectively prepared.

In order for the image processing engine 38A to input image data required for processing in units of the unit processing data amount, the control section 38B acquires the image data from a module (for example, one of the buffer modules 40) at a stage preceding the subject module in units of a unit reading data amount. Then, image data to be outputted from the image processing engine 38A is outputted to a module at a following stage (for example, one of the buffer modules 40) in units of a unit writing data amount (if the image processing that is carried out at the image processing engine 38A is not associated with an increase/reduction in data volumes, such as compression or the like, then the unit writing data amount=the unit processing data amount), or a result of image processing is outputted to outside the subject module by the image processing engine 38A (for example, if the image processing engine 38A is performing image analysis processing such as skew angle detection processing or the like, an image analysis processing result such as a skew angle detection result or the like may be outputted instead of image data). Image processing modules 38 of which types and contents of image processing to be executed by the image processing engines 38A are the same but the above-mentioned unit processing data amounts, unit reading data amounts and unit writing data amounts or the like are different are also registered in the module library 36. For example, for image processing modules 38 for image rotation processing, in addition to a program for an image processing module 38 at which the unit processing data amount is an image single plane unit as mentioned earlier, a program for an image processing module 38 at which the unit processing data amount is an amount corresponding to an image single line amount, an image plural line amount or the like may be registered in the module library 36.

The program of an individual image processing module 38 that is registered in the module library 36 is constituted of a program corresponding to the image processing engine 38A and a program corresponding to the control section 38B. The program corresponding to the control section 38B is made as a component. Of the individual image processing modules 38, for image processing modules 38 for which the unit reading data amounts and unit writing data amounts are the same, the programs corresponding to the control sections 38B are common, regardless of the type, contents and the like of the image processing to be executed by the image processing engines 38A (that is, the same program is used as the programs corresponding to the control sections 38B). As a result, a development workload for development of the programs of the image processing modules 38 is ameliorated.

Among the image processing modules 38, there are modules for which, in a state in which a attribute of image data to be inputted is unknown, the unit reading data amount and unit writing data amount are not determined, and when a attribute of input image data is acquired, the unit reading data amount and unit writing data amount are found by substituting the acquired attribute into an equation and calculating. Of this kind of image processing module 38, for image processing modules 38 for which the unit reading data amounts and unit writing data amounts are calculated using the same equations, the programs corresponding to the control sections 38B may be common. Anyway, the image processing program group 34 relating to the exemplary embodiment can be installed at various kinds of devices as mentioned earlier. Obviously, in the image processing program group 34, it is possible to suitably add, remove, replace, etc. numbers, types and the like of the image processing modules 38 that are registered in the module library 36, in accordance with image processing that will be required at the type of device at which the image processing program group 34 will be installed.

Now, an individual buffer module 40 structuring the image processing section 50 is structured with a buffer 40A and a buffer control section 40B as shown in, for example, FIG. 4B. The buffer 40A is structured by a memory region which is reserved through the operating system 30 from the memory 14 provided at the computer 10. The buffer control section 40B performs input and output of image data to and from modules at stages preceding and following the buffer module 40, and manages the buffer 40A. The substance of the buffer control section 40B of the individual buffer module 40 is also a program which is executed by the CPU 12. The programs of the buffer control sections 40B are also registered in the module library 36. In FIG. 1, the programs of the buffer control sections 40B are shown with the label "buffer module".

As will be described in more detail later, as systems of processing for image processing with the image processing section 50, there are a parallel processing system, in which image processes are carried out in parallel with one another at the individual image processing modules 38 of the image processing section 50, and a sequential processing system, in which image processing is carried out continually by a single image processing module 38 of the image processing modules 38 of the image processing section 50 and the image processing modules 38 which are carrying out the image processing are sequentially arranged (switched). In the exemplary embodiment, if the image processing is to be carried out in a parallel processing system, the image processing section 50 is formulated for parallel processing, and if the image processing is to be carried out in a sequential processing system, the image processing section 50 is formulated for sequential processing. Thus, the system of processing of image processing in the image processing section 50 can be switched.

A number of the image processing modules 38 performing image processing in a sequential processing system is always one. Thus, at any time, only one of the image processing modules 38 is accessing the buffers 40A of the buffer modules 40. In contrast, in a parallel processing system, all the image processing modules 38 perform image processing in parallel. Therefore, it is possible that plural image processing modules 38 will access the buffer 40A of one of the buffer modules 40 simultaneously. Consequently, it is necessary to perform exclusive access control with regard to access to the buffer module 40. Accordingly, in the exemplary embodiment, buffer modules 40 to which a function for performing exclusive access control is applied are prepared for parallel processing and buffer modules 40 to which the function for performing exclusive access control is not applied are prepared for sequential processing. A program of the buffer modules 40 in which the function for performing exclusive access control is applied and a program of the buffer modules 40 in which the function for performing exclusive access control is not applied are respectively registered in the module library 36.

The processing formulation section 42, which formulates the image processing section 50 in accordance with instructions from the application 32, is structured with plural kinds of module creation section 44, as shown in FIG. 1. The plural kinds of module creation section 44 correspond to mutually different image processes, and are activated by the application 32 to perform processing which creates module groups formed of the image processing modules 38 and the buffer modules 40 for realizing the corresponding image processing. FIG. 1 shows, as an example of the module creation sections 44, module creation sections 44 corresponding to the kinds of image processing that are executed by the individual image processing modules 38 registered in the module library 36. However, the image processing corresponding to an individual module creation section 44 may be image processing which is executed by plural kinds of the image processing modules 38 (for example, a skew correction process composed of skew angle detection processing and image rotation processing). In a case in which required image processing is a process in which plural kinds of image processing are combined, the application 32 sequentially activates the module creation sections 44 corresponding to each of the plural kinds of image processing. Hence, the image processing section 50 which is to perform the required image processing is formulated by the module creation sections 44 which have been sequentially activated by the application 32.

Further, as shown in FIG. 1, in the processing management section library 47, programs of processing management sections 46 are plurally registered. The individual processing management sections 46 are structured to include a workflow management section 46A, which controls execution of image processing in the image processing section 50, a resource management section 46B, which manages employment of resources of the computer 10 such as the memory 14, various files and the like by the modules of the image processing section 50, and an error management section 46C, which manages errors which occur in the image processing section 50. The processing management sections 46 for which programs are registered in the processing management section library 47 are principally divided into a parallel processing management section and a sequential processing management section. The parallel processing management section formulates the image processing section 50 for parallel processing (the image processing section 50 using the buffer modules 40 with the exclusive access control function as the buffer modules 40), and controls such that image processing is carried out with a parallel processing system in the image processing section 50 which has been formulated. The sequential processing management section formulates the image processing section 50 for sequential processing (the image processing section 50 using the buffer modules 40 without the exclusive access control function as the buffer modules 40), and controls such that image processing is carried out with a sequential processing system in the image processing section 50 which has been formulated.

FIG. 1 only shows one each of a parallel processing management section program and a sequential processing management section program. However, as parallel processing management section programs, plural kinds of parallel processing management section, which cause parallel processes with mutually different contents to be performed by image processing sections 50, can be respectively registered in the processing management section library 47. Furthermore, as sequential processing management section programs, plural kinds of sequential processing management section, which cause sequential processes with mutually different contents to be performed by image processing sections 50, can be respectively registered. The processing formulation section 42 is provided with a selection activation section 45. When formulation of the image processing section 50 is instructed from the application 32, the selection activation section 45 selectively activates any processing management section from among the respective processing management sections registered in the processing management section library 47.

Here, a parallel processing management section corresponds to a parallel processing control section, and a sequential processing management section corresponds to a sequential processing control section.

Next, operation of the exemplary embodiment will be described. When a device in which the image processing program group 34 is installed enters a state in which the performance of some image processing is required, this state is sensed by the specific application 32. States in which performance of image processing is required include cases in which execution of a job is instructed by a user for, for example, reading an image with an image-reading section which serves as the image data provision section 22 and one or more of recording the image at a recording material with an image recording section which serves as the image output section 24, displaying the image at a display section which serves as the image output section 24, writing image data to a recording medium with a writing device which serves as the image output section 24, transmitting image data with a transmission section which serves as the image output section 24 and storing image data to an image memory section which serves as the image output section 24. Alternatively, there are cases in which execution of a job is instructed by a user for, with respect to image data which has been received by a reception section which serves as the image data provision section 22 or stored at an image memory section which serves as the image data provision section 22, performing any of the above-mentioned recording to a recording material, displaying at a display section, writing to a recording medium, transmitting and storing to an image memory section. States in which performance of image processing is required are not limited to those described above. For example, there may be cases in which, in accordance with instructions from a user, processing of an execution object is selected by the user from a state in which a list of names and other details of processes that can be executed by the application 32 is displayed at the display section 16, or the like.

When, as described above, a state in which performance of some image processing is required is sensed, the application 32 activates the selection activation section 45 of the processing formulation section 42 (step 150 in FIG. 2). The selection activation section 45 which has been activated by the application 32 first refers to processing system selection information (step 152 in FIG. 2). This processing system selection information is information representing a result of selection of a processing management section 46 to be an object of activation from among the processing management sections 46 for which programs are registered in the processing management section library 47, consequent to consideration by a user as to which of parallel processing and sequential processing is suitable as a processing system of the image processing section 50, or the like. This user sets data that is settable and to which a selection section can refer, as in, for example, an operation configuration file (such as a file with the extension "*.ini"), a registry or the like. The selection activation section 45 refers to the processing system selection information, identifies the processing management section 46 to be designated as the object of activation, and activates the identified processing management section 46 (step 156 in FIG. 2). The activated processing management section 46 enters an operating state, and waits until input of any request, instruction or the like from outside (a request for creation of a buffer module, or an image processing execution instruction, which will be described later).

However, the processing system selection information is not limited to information which directly designates the processing management section 46 to be the object of activation as described above. It may also be information which describes selection conditions for regulating which of the processing management sections 46 for which programs are registered in the processing management section library 47 to select as an object of activation when the image processing section 50 has a particular operating environment. As an environmental variable in such a condition, for example, a number of program execution resources provided in the computer 10 (for example, the CPU 12 and the like) may be used. For example, a condition such as "if a number of programming execution resources is N or more, then activate the parallel processing management section 46, and if less than N, then activate the sequential processing management section 46" or the like may be described in the processing system selection information.

In a case in which the processing system selection information is information describing a selection condition as described above, the selection activation section 45, for example, refers to the processing system selection information (step 152 in FIG. 2) and identifies the above-mentioned selection condition. Then, the selection activation section 45 acquires (an) environmental variable(s) (for example, a number of the CPU 12 or the like) to be used in the identified selection condition, via the operating system 30 or the like (step 154 in FIG. 2). By comparison of an identified environmental variable with a threshold value provided in the selection condition (for example, the above-mentioned 'N'), which of the processing management sections 46 is to be selected as the object of activation is determined, and the processing management section 46 which has been selected as the object of activation is activated (step 156 in FIG. 2). In such a case, the processing system of the image processing section 50 can be selected in accordance with the operating environment of the image processing section 50.

As the above-mentioned environmental variable, it is also possible to include another variable such as, for example, a number of the image processing modules 38 that are used to structure the image processing section 50 or the like. For example, the processing management section 46 to be selected as the object of activation can be switched in accordance with a magnitude relationship between a value of "number of program execution resources÷number of image processing modules" and a threshold value (for example, 1 or a value thereabout). The processing system selection information is not limited to information which is set by users. It is also possible to perform setting beforehand (during development of the image processing program group 34). Herein, the selection activation section 45 which performs the above processing corresponds to a selection section.

When activation of the selection activation section 45 has finished, the application 32 identifies a type of the image data provision section 22 which is a source of provision of image data of an object of image processing (step 158 in FIG. 2). If the identified type is a buffer region (a partial region of the memory 14), the application 32 notifies the processing management section 46 that is operating of the buffer region that has been designated as the image data provision section 22, and requests the processing management section 46 to create a buffer module 40 to function as the image data provision section 22. In such a case, the processing management section 46 loads the program of the buffer control section 40B into the memory 14 such that the CPU 12 can execute the program, and sets parameters in the buffer control section 40B which identify the notified buffer region (the buffer region designated as the image data provision section 22) as the buffer 40A, which has already been reserved. Thus, the processing management section 46 creates a buffer module 40 which functions as the image data provision section 22 (step 160 in FIG. 2) and returns a response to the application 32. Here, if the operating processing management section 46 is the parallel processing management section 46, then a buffer module 40 with the exclusive access control function is created to serve as the above-mentioned buffer module 40, and if the operating processing management section 46 is the sequential processing management section 46, then a buffer module 40 without the exclusive access control function is created to serve as the above-mentioned buffer module 40.

Next, the application 32 identifies a type of the image output section 24 which is an output destination of the image data (step 162 in FIG. 2). If the identified type is a buffer region (a partial region of the memory 14), the application 32 notifies the operating processing management section 46 of the buffer region that has been designated as the image output section 24, and a buffer module 40 including the buffer region designated as the image output section 24 (a buffer module 40 which functions as the image output section 24) is created by the processing management section 46 (step 164 in FIG. 2). Here too, if the operating processing management section 46 is the parallel processing management section 46, then a buffer module 40 with the exclusive access control function is created to serve as this buffer module 40, and if the operating processing management section 46 is the sequential processing management section 46, then a buffer module 40 without the exclusive access control function is created to serve as this buffer module 40.

Next, the application 32 identifies contents of the image processing that is to be executed, and analyzes the image processing to be executed into a combination of image processes at a level corresponding to the individual module creation sections 44, and determines types of image process and an execution sequence of the individual image processes which are required for realizing the image processing that is to be executed (step 166 in FIG. 2). This determination may be realized by, for example, registering the above-mentioned types of image process and execution sequence of individual image processes beforehand in association with types of jobs for which it is possible for a user to instruct execution, and the application 32 reading information corresponding to a type of job whose execution has been instructed.

Then, in accordance with the types and execution sequence of image processes determined as above, the application 32 activates the module creation section 44 corresponding to a particular image process (step 168 in FIG. 2). The activated module creation section 44 is notified with, as information which is required for creation of a module group by that module creation section 44, input module identification information for identifying an input module which inputs image data to the module group, output module identification information for identifying an output module to which the module group outputs image data, input image attribute information which represents an attribute of input image data to be inputted to the module group, and parameters of the image processing to be executed, and the module creation section 44 is instructed to create the corresponding module group (step 170 in FIG. 2). Further, if the required image processing is processing in which plural types of image processing are combined, when the application 32 is notified by the module creation section 44 that has been instructed that creation of the module group thereof is complete, the application 32 activates another of the module creation sections 44 corresponding to an individual image process and notifies information that is necessary for creation of a module group (steps 168 and 170 in FIG. 2), and this processing is repeated in order of the execution sequence of the individual image processes.

With regard to the above-mentioned input module, for a module group which is first in the execution sequence, the image data provision section 22 will be the input module. For second and subsequent modules in the execution sequence, a last module of a preceding module group (usually one of the buffer modules 40) is the input module. Further, with regard to the above-mentioned output module, the image output section 24 will be the output module of a module group which is last in the execution sequence, so the image output section 24 is designated as the output module thereof. For other module groups, because the output module is not definite, it is created and specified by the module creation section 44 as required, without specified by the application 32. Further, with regard to the input image attribute and image processing parameters, it is possible to, for example, register these beforehand as information in association with the types of job for which it is possible for a user to instruct execution, such that the application 32 can identify these by reading the information corresponding to the type of job whose execution has been instructed. Alternatively, the input image attribute and image processing parameters can be designated by a user.

Anyway, a module creation section 44 is activated by the application 32 and performs module creation processing (step 172 in FIG. 2). In the module creation processing, firstly, the input image attribute information representing the attribute of input image data which is to be inputted to the image processing module 38 of an object of the creation is acquired. This processing for acquiring the attribute of the input image data can be realized, if there is a buffer module 40 preceding the image processing module 38 of the creation object, by acquiring a attribute of output image data from an image processing module 38 preceding that buffer module 40, which performs writing of image data to the buffer module 40.

Then, in accordance with the attribute of input image data that the acquired information represents, it is determined whether or not creation of the image processing module 38 of the creation object is necessary. For example, in a case in which the module creation section 44 is a module creation section which creates a module group for performing color conversion processing and the CMY color space is designated by the application 32 as a color space of output image data according to the image processing parameters, if it is apparent that the input image data according to the acquired input image attribute information is data in the RGB color space, then it is necessary to create an image processing module 38 which carries out a color space conversion from RGB to CMY as the image processing module 38 for performing color space processing. However, if the input image data is data in the CMY color space, the attribute of the input image data and the attribute of the output image data match with respect to color space, and thus it is judged that it is unnecessary to create the image processing module 38 for performing color space conversion processing.

Figure 3C:
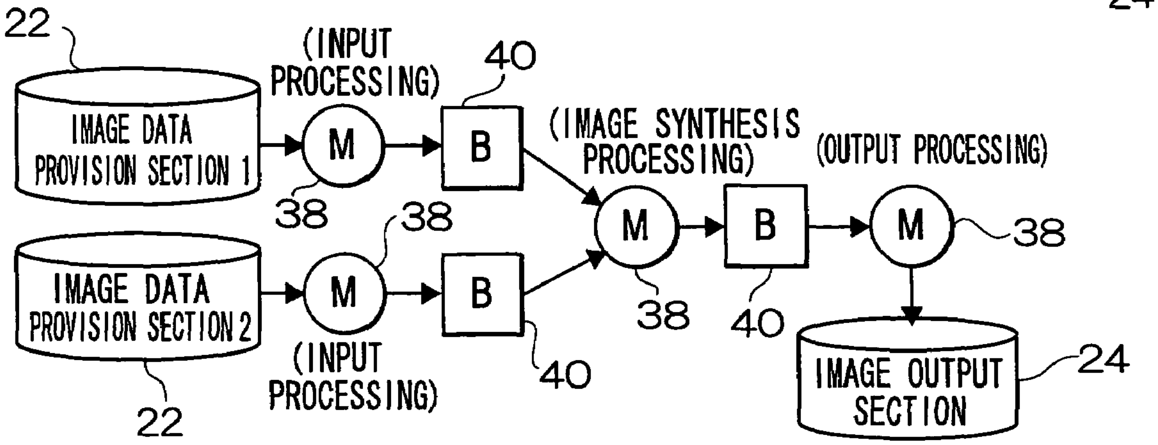
Figure 3C:
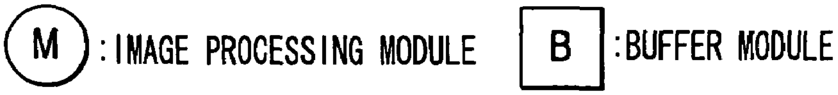

If it is judged that creation of the image processing module 38 of the creation object is necessary, then it is determined whether or not a buffer module 40 following the image processing module 38 of the creation object is necessary. This determination is negative if the following image processing module is an output module (i.e., the image output section 24) (for example, the image processing modules 38 of the last stages of the image processing sections 50 shown in FIGS. 3A to 3C), or if the image processing module is a module which outputs a result of performing an image process such as an analysis or the like of the image data to another image processing module 38 (for example, the image processing module 38 which performs skew angle detection analysis in the image processing section 50 shown in FIG. 3B), or the like. However, in other cases, this determination is positive, and the operating processing management section 46 is requested to create the buffer module 40, which is connected with a following image processing module 38.

When creation of the buffer module 40 is requested, the processing management section 46 loads the program of the buffer control section 40B into the memory 14 such that the CPU 12 can execute the program. Thus, the buffer module 40 is created (step 172 in FIG. 2) and a response is returned to the module creation section 44. If the operating processing management section 46 is the parallel processing management section 46, a buffer module 40 with the exclusive access control function is created to serve as the above-mentioned buffer module 40, and if the operating processing management section 46 is the sequential processing management section 46, a buffer module 40 without the exclusive access control function is created to serve as the above-mentioned buffer module 40.

Next, in accordance with: information of a preceding module (for example, a buffer module 40); information of the following buffer module 40 (only for an image processing module 38 for which the following buffer module 40 is created); the attribute of input image data which is inputted to the image processing module 38; and the processing parameters, the module creation section 44 selects, from among plural candidate modules which have been registered in the module library 36 and can be used as the image processing module 38, an image processing module 38 which matches the previously acquired attribute of input image data and processing parameters. Then, the program of the selected image processing module 38 is loaded into the memory 14 such that the CPU 12 can execute the program, and parameters which identify modules preceding and following this image processing module 38 are set in the control section 38B of this image processing module 38, and thus the image processing module 38 is created.

For example, in a case in which the module creation section 44 is the module creation section which creates a module group for performing color conversion processing, and the CMY color space is designated as the color space of output image data by a processing parameter and the input image data is data in the RGB color space, then from among the plural image processing modules 38 for performing various color conversion processes that are registered in the module library 36, the image processing module 38 which performs color space conversion from RGB to CMY is selected and created. If the image processing module is to be an image processing module 38 for performing magnification/reduction processing and a designated magnification/reduction ratio is not 50%, then the image processing module 38 which performs magnification/reduction on inputted image data to a designated magnification/reduction ratio is selected and created. If the designated magnification/reduction ratio is 50%, then the image processing module 38 which performs specific magnification/reduction processing to the magnification/reduction ratio of 50%, that is, magnification/reduction processing which reduces to 50% by thinning out alternate pixels from inputted image data is selected and created.

Selection of the image processing modules 38 is not limited by the above description. For example, it is also possible to have plurally registered image processing modules 38 with different unit processing data amounts for image processing by the image processing engines 38A in the module library 36, and select the image processing module 38 with an appropriate unit processing data amount in accordance with operating conditions, such as the size of a memory region that can be assigned to the image processing section 50 and the like (for example, selecting an image processing module 38 with a small unit processing data amount when that size is small). Alternatively, selection by the application 32 or a user is also possible.

When creation of the image processing module 38 is complete, the operating processing management section 46 is notified of a pair of IDs: an ID of the following buffer module 40 and an ID of the created image processing module 38. These IDs may be information which can uniquely identify the individual modules. For example, the IDs may be consecutive numbers applied in the order of creation of the individual modules, addresses of objects of the buffer modules 40 and image processing modules 38 in memory, or the like. Then, in a case in which the module creation section 44 is creating a module group which performs image processing which is realized by plural kinds of the image processing modules 38 (for example, skew correction processing which is realized by the image processing module 38 which performs skew angle detection processing and the image processing module 38 which performs image rotation processing), the above processing is repeated to create a module group containing two or more of the image processing modules 38. The above-described module creation processing is sequentially carried out by the individual module creation sections 44 which are sequentially activated by the application 32 and, as shown by the examples in FIGS. 3A to 3C, the image processing section 50 which will carry out the required image processing is formulated.

Now, when the above-described module creation processing has been sequentially carried out by the sequentially activated module creation sections 44, and thus formulation of the image processing section 50 for performing the required image processing has finished, the application 32 instructs the operating processing management section 46 to execute image processing with the image processing section 50 (step 174 in FIG. 2). When the processing management section 46 is instructed to execute image processing by the application 32, the processing management section 46 executes the programs of the modules of the image processing section 50 which have been loaded into the memory 14, through the operating system 30, as threads. Here, in a case in which the operating processing management section 46 is the parallel processing management section, the processing management section 46 carries out the image processes of the individual image processing modules 38 of the image processing section 50 in parallel with one another. Consequently, the programs of the individual modules formulating the image processing section 50 are executed by the CPU 12 as separate threads (corresponding to execution unit programs). In a case in which the operating processing management section 46 is the sequential processing management section, the processing management section 46 causes the programs of the individual modules formulating the image processing section 50 to be executed at the CPU 12 as a single thread. Note that, rather than threads, these may be executed at the CPU 12 as processes or objects.

When programs of the image processing modules 38 are being executed as (a) thread(s), the control section 38B of an individual image processing module 38 carries out initialization of the subject module. In initialization of the image processing module 38, firstly, module(s) preceding the subject module is/are determined on the basis of the parameters set by the module creation section 44. If there is no module preceding the subject module, no processing is performed. However, if the preceding module is something other than a buffer module 40, being, for example, the image data provision section 22, a particular file or the like, then the initialization processing is performed as necessary. If a buffer module 40 precedes the subject module, then a data amount of image data to be acquired by a single cycle of reading of image data from the buffer module 40 (i.e., the unit reading data amount) is identified.

If a number of buffer modules 40 preceding the subject module is one, the unit reading data amount is a unit amount. However, in a case in which the number of preceding buffer modules 40 is more than one and the image processing engine 38A will use the image data respectively acquired from this plural buffer modules 40 to perform image processing, as at the image processing module 38 which performs image synthesis processing in the image processing section 50 shown in FIG. 3C, then unit reading data amounts corresponding to the individual preceding buffer modules 40 are set in accordance with the type and contents of the image process that the image processing engine 38A of the subject module is to carry out, the number of buffer modules 40 at the preceding stage, and suchlike. Hence, the preceding buffer modules 40 are notified of the identified unit reading data amounts, and the unit reading data amounts are set in all the buffer modules 40 of the preceding stage ((1) in FIG. 4A).

Next, a module following the subject module is determined. In a case in which the module following the subject module is something other than the buffer module 40, being, for example, the image output section 24, a particular file or the like, initialization processing is performed as necessary (for example, if the following module is the image output section 24, processing to notify of output of image data in data amounts corresponding to a unit writing data amount, or the like). If the following module is a buffer module 40, a data amount of image data in one cycle of writing of the image data (i.e., the unit writing data amount) is identified, and the corresponding unit writing data amount is set in the following buffer module ((2) in FIG. 4A). Then, the processing management section 46 is notified of completion of initialization at this image processing module 38.

When the programs of the buffer modules 40 (the buffer control sections 40B) are executed as a thread, the buffer control section 40B of an individual buffer module 40 performs initialization of the subject module. In initialization of the buffer module 40, firstly, a unit writing data amount is notified from an image processing module 38 preceding the subject module and/or a unit reading data amount is notified from an image processing module 38 following the subject module, and for each of these the notified unit writing data amount or unit reading data amount is stored ((1) and (2) in FIG. 4B).

When the unit writing data amount and unit reading data amount(s) have been notified from all the image processing modules 38 that are connected to the subject module, the buffer control section 40B, on the basis of the unit writing data amount and unit reading data amount(s) which have been respectively set by the individual image processing modules 38 that are connected with the subject module, determines the size of a unit buffer region, which is a management unit of the buffer 40A of the subject module, and stores the determined size of the unit buffer region. The size of the unit buffer region may be se at a maximum value from among the unit writing data amount and unit reading data amount(s) set for the subject module. However, the unit writing data amount may be set, or the unit reading data amount may be set (in a case in which plural image processing modules 38 are connected following the subject module, a maximum value of the unit reading data amounts which have been respectively set by the individual image processing modules 38). It is also possible to set a minimum common multiple of the unit writing data amount and (a maximum value of) the unit reading data amount(s). It is also possible to set this minimum common multiple if the minimum common multiple is less than a predetermined value, but if the minimum common multiple is larger than the predetermined value, to set a different value (for example, any of a maximum value from among the above-mentioned unit writing data amount and unit reading data amount(s); the unit writing data amount; or a (maximum value of) the unit reading data amounts).

In a case in which the subject module is a buffer module 40 which functions as the image data provision section 22 or the image output section 24, there is already a memory region present to be used as the buffer 40A of the subject module, and therefore the unit buffer region size determined above is altered to the size of the previously established memory region which is used as the buffer 40A of the subject module. Further, an effective data pointer corresponding to an individual image processing module 38 following the subject module is created, and the effective data pointer is initialized. This effective data pointer is pointers which indicate, in image data that has been written to the buffer 40A of the subject module by an image processing module preceding the subject module, each of a start position (a next reading-commencement position) and an end position of image data which has not been read by the corresponding following image processing module 38 (effective data). At the time of initialization, particular information signifying that effective data is absent is always set. However, if the subject module is the buffer module 40 which functions as the image data provision section 22, the image data of an object of image processing will have already been written to the memory region to be used as the buffer 40A of the subject module. In this case, the start position and end position of corresponding image data are set in the effective data pointer corresponding to each individual following image processing module 38. The initialization of the buffer module 40 is completed by the above processing, and the buffer control section 40B notifies the processing management section 46 that initialization is complete.

When the processing management section 46 has been notified by all the modules constituting the image processing section 50 that initialization is complete, a thread (or a process or object) for executing a program of the workflow management section 46A is activated, and the processing management section 46 instructs the workflow management section 46A to execute image processing with the image processing section 50. Here, for the individual processing management sections 46 for which programs are registered in the processing management section library 47, processings that the individual workflow management sections 46A perform are different from one another. If the processing management section 46 that is operating is the parallel processing management section, the parallel control processing shown in, for example, FIGS. 8A to 8D is performed by the activated workflow management section 46A. If the operating processing management section 46 is the sequential processing management section, the block unit sequential control processing shown in, for example, FIGS. 10A to 10D is performed by the activated workflow management section 46A. These processings cause image processing to be carried out in the image processing section 50 by inputting processing requests to the image processing modules 38 that structure the image processing section 50. Before a description of operations of the image processing section 50 as a whole herebelow, processing that is carried out by the buffer control section 40B of an individual buffer module 40 and processing which is carried out by the control section 38B of an individual image processing module 38 will be described, in that order.

In the exemplary embodiment, when an image processing module 38 is to write image data to the following buffer module 40, a writing request is inputted from the image processing module 38 to the buffer module 40. When the image processing module 38 is to read image data from the preceding buffer module 40, a reading request is inputted from the image processing module 38 to that buffer module 40. When a writing request is inputted to a buffer module 40 with the exclusive access control function from the preceding image processing module 38 (and when a below-mentioned timer times out), the data writing processing described below is executed by the buffer control section 40B.

In the data writing processing which is carried out by the buffer control section 40B of the buffer module 40 with the exclusive access control function, firstly, it is determined whether or not the buffer 40A of the subject module is already being accessed. If the individual image processing modules 38 of the image processing section 50 are carrying out image processing in parallel, reading of data at the buffer module 40 is carried out non-synchronously with writing. Hence, if the buffer 40A is already being accessed, information of the inputted writing request is stored in a work memory or the like, the timer is started and a data writing process is temporarily stopped. In subsequent processing, the inputted writing request information serves as information of an object of processing. Later, when the timer times out and the data writing process is activated, the writing request information which was previously inputted and stored in the work memory or the like is extracted from the work memory or the like, and subsequent processing is carried out with the extracted writing request information serving as information of the object of processing.

Herein, the processing described above, in which it is determined whether or not the buffer 40A is already being accessed, and if the buffer 40A is already being accessed, the writing request information is stored and the timer is started, and when the timer times out, it is again determined whether or not the buffer 40A is being accessed, corresponds to "exclusive access control with respect to access to the buffer".

When it is determined that the buffer 40A is not being accessed, in the subsequent data writing processing, a unit writing data amount, which is the size of a memory region to be reserved, is notified to the resource management section 46B, and a memory region to be used for writing (a buffer region for writing; see FIG. 5B) is acquired through the resource management section 46B of the operating processing management section 46. Next, among unit buffer regions for storage which structure the buffer 40A of the subject module, it is determined whether or not there is a unit buffer region that includes empty space of at least the unit writing data amount (i.e., a unit buffer region to which it is possible to write image data in the unit writing data amount). At the buffer module 40 which is created by the module creation section 44, a memory region to be used as the buffer 40A (the unit buffer region(s)) is not initially reserved. Rather, a unit buffer region is reserved each time a shortage of memory space occurs. Therefore, when a first writing request is inputted to the buffer module 40, there is no memory region (unit buffer region) to be used as the buffer 40A, and this determination will be negative. Further, even after a unit buffer region to be used as the buffer 40A has been reserved, by means of processing which will be described later, the above determination will be negative if memory space in the corresponding unit buffer region is less than the unit writing data amount when image data is to be written to the corresponding unit buffer region.

If it is determined that there is not a unit buffer region including empty space of at least the unit writing data amount (a unit buffer region to which it is possible to write image data in the unit writing data amount), the size of a memory region to be reserved (the size of the unit buffer region(s)) is notified to the resource management section 46B, and a memory region to be used as the buffer 40A of the subject module (a unit buffer region to be used for storage of image data) is acquired through the resource management section 46B. Then, with the previously acquired buffer region for writing serving as a writing region, the image processing module 38 that is the source of the writing request is notified of a start address of the corresponding writing region, and a request is made for writing of image data of the object of writing, sequentially from the notified start address. Hence, the image processing module 38 that is the writing request source writes the image data to the buffer region for writing of which the start address was notified (see FIG. 5B).

Figures 5A, 5B, 5C:
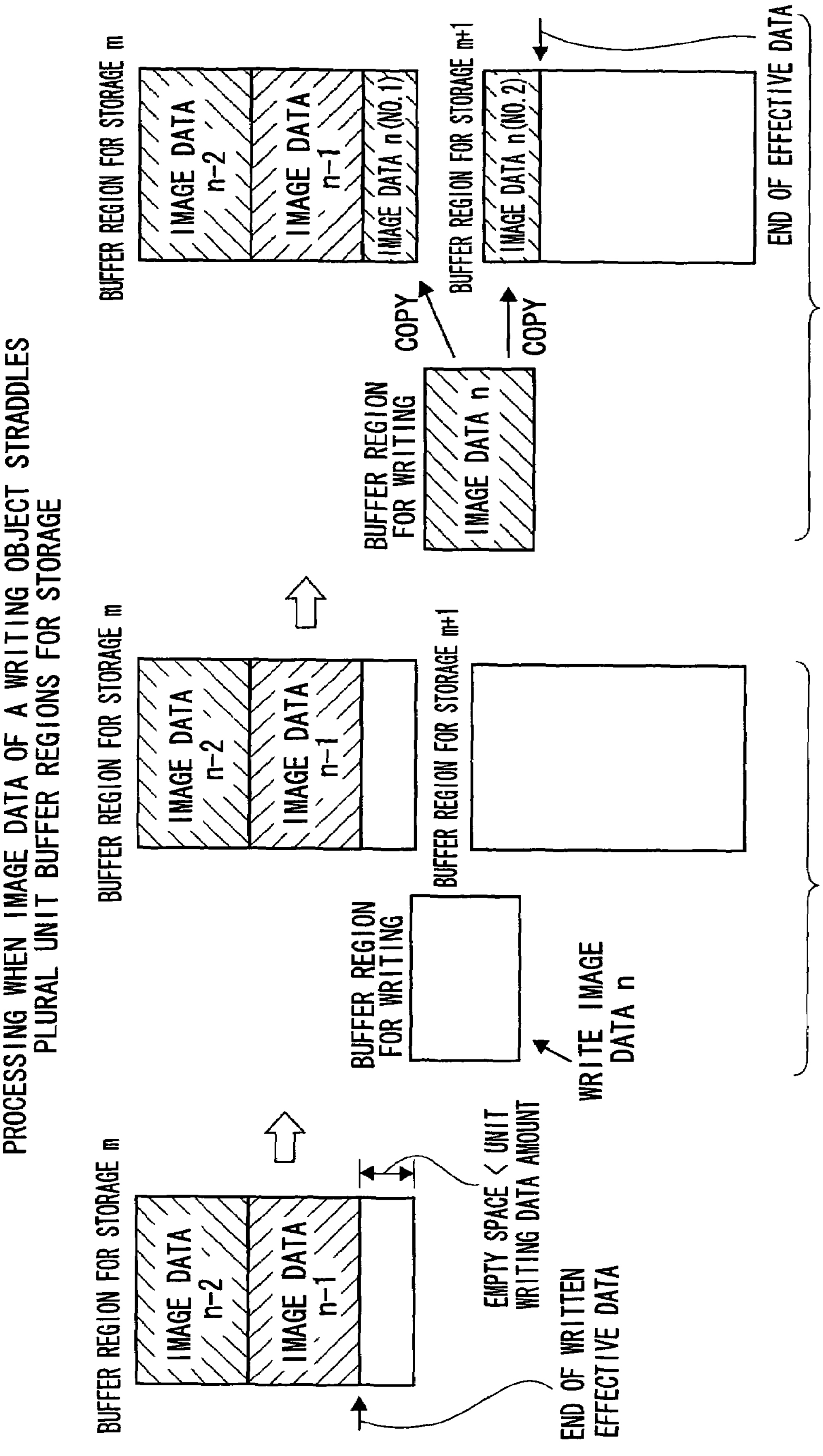
FIGS. 5A, 5B and 5C are schematic diagrams describing a case in which image data of a writing object straddles plural unit buffer regions for storage.

If, for example, the size of the unit buffer region is not an integer multiple of the unit writing data amount, then when image data has been repeatedly written in the unit writing data amount to the buffer 40A (i.e., the unit buffer region), a condition occurs in which, as shown by the example in FIG. 5A, the size of an empty region at the unit buffer region that includes empty space is smaller than the unit writing data amount. In such a case, a region to which a unit writing data amount of image data will be written will straddle more than one of the unit buffer regions. In the exemplary embodiment, because the memory region used as the buffer 40A is reserved in units of the unit buffer region, it is not guaranteed that unit buffer regions that are reserved at different times will be at adjacent regions in actual memory (the memory 14). In contrast, in the exemplary embodiment, the writing of image data by the image processing module 38 is performed to the buffer region for writing, which is reserved separately from the unit buffer regions for storage, and, as shown in FIG. 5C, image data which has been temporarily written to the buffer region for writing is copied into one or plural unit buffer regions for storage. Therefore, regardless of whether or not a region to which image data is to be written straddles plural unit buffer regions, notification of a region of writing to the image processing module 38 that is the writing request source need only give notice of a start address thereof as described above.

If the subject module is a buffer modules 40 as created by the application 32, that is, if the memory region to be used as the buffer 40A has already been reserved, then an address of the already-reserved memory region is notified to the image processing module 38 as the address of a writing region, and writing of the image data is carried out to this memory region. When writing of image data to the memory region by the preceding image processing module 38 has finished, attribute information is appended to the data that has been written to the buffer region for writing, and the data is then written without alteration to the buffer region for storage. Here, if the size of the empty region in the unit buffer region that includes empty space is smaller than the unit writing data amount, then the image data that has been written to the buffer region for writing is divided and written to plural the unit buffer regions for storage, as shown in FIG. 5C.

Then, in the effective data pointer corresponding to the individual image processing module 38 following the subject module, the pointer representing the end position of effective data is altered such that the end position of effective data indicated by this pointer moves downward by an amount corresponding to the unit writing data amount (see FIG. 5C). Then, the memory region that was previously reserved as the buffer region for writing is released by the resource management section 46B, and the data writing processing temporarily stops. Note that a structure is also possible in which the buffer region for writing is reserved at the time of initialization of the buffer module 40 and released at a time of erasure of the buffer module 40.

The data writing processing described hereabove is a data writing process which is carried out by the buffer control sections 40B of the buffer modules 40 with the exclusive access control function which are incorporated in the image processing section 50 for parallel processing. Data writing processing which is carried out by the buffer control sections 40B of the buffer modules 40 without the exclusive access control function, which are incorporated in the image processing section 50 for sequential processing, is the same as the data writing process described above except in that processing corresponding to exclusive access processing is not performed (that is, the processing which determines whether or not the buffer 40A is already being accessed, and if the buffer 40A is being accessed, stores writing request information and starts a timer, and determines again whether or not the buffer 40A is being accessed when the timer times out). Because the data writing processing of the buffer modules 40 without the exclusive access control function omits the processing corresponding to the exclusion processing, which is not necessary for sequential processing, processing efficiency can be improved.

Next, data reading processing which is executed by the buffer control section 40B of the buffer module 40 when a reading request is inputted from the following image processing module 38 to the buffer module 40 with the exclusive access control function (and when a timer which will be described later times out) will be described.

In the data reading process which is carried out by the buffer control section 40B of the buffer module 40 with the exclusive access control function, firstly, it is determined whether or not a cause of the activation of the current data reading processing is activation by input of a reading request from the following image processing module. If the determination is positive, reading request information inputted from the following image processing module is registered at the end of a reading queue. Next, it is determined whether or not the buffer 40A of the subject module is already being accessed. If the buffer 40A is being accessed, it is determined whether or not reading request information has been registered in the reading queue. If reading request information is not registered, the data reading process simply ends. If reading request information has been registered, the timer is started, and then the data reading process stops. When the timer times out, the data reading process is again activated, the unprocessed reading request (information) which has been registered in the reading queue is again extracted, and processing in accordance with the reading request is carried out.

Herein, the processing described above, in which reading request information from the following image processing module is temporarily registered at the end of the queue, it is determined whether or not the buffer 40A is already being accessed, and if the buffer 40A is being accessed and reading request information has been registered in the queue, the timer starts and, when the timer times out, it is again determined whether or not the buffer 40A is being accessed, corresponds to "exclusive access control with respect to access to the buffer". With the exclusive access control in the data reading processing and the above-described data writing processing, occurrences of problems when plural requests are simultaneously or almost simultaneously inputted to a single buffer module 40 can be avoided. Consequently, it is possible for the CPU 12 of the computer 10 to execute threads corresponding to the individual modules of the image processing section 50 for parallel processing in parallel.

Anyway, when the buffer 40A of the subject module is not being accessed, reading request information registered at the top of the reading queue is extracted therefrom. On the basis of request source identification information included in the extracted reading request information, the image processing module 38 that is the source of the reading request is identified, and a unit reading data amount specified by the reading request source image processing module 38 is identified.

Then, based on the effective data pointer that corresponds to the reading request source image processing module 38, a start position and end position in the buffer 40A of effective data corresponding to the reading request source image processing module 38 are identified. Next, based on the identified start position and end position of the effective data, it is determined whether or not effective data corresponding to the reading request source image processing module 38 (image data that the image processing module 38 of the reading request source can read), is at least the unit reading data amount.

If the effective data corresponding to the reading request source image processing module 38 is less than the unit reading data amount, then it is determined whether or not the end of the effective data that the reading request source image processing module 38 can read is the end of image data of the image processing object. When effective data corresponding to the reading request source image processing module 38 is to be stored in at least the unit reading data amount at the buffer 40A, or effective data corresponding to the reading request source image processing module 38 that is to be stored at the buffer 40A is less than the unit reading data amount but the end of this effective data is the end of image data of the processing object, the unit reading data amount corresponding to the reading request source image processing module 38 is notified to the resource management section 46B as the size of a memory region to be reserved. Hence, reservation of a memory region to be used for reading (i.e., a buffer region for reading; see FIG. 6B) is requested to the resource management section 46B, and the buffer region for reading is acquired through the resource management section 46B.

Next, effective data which is a reading object is read from the buffer 40A in an amount corresponding to the unit reading data amount and written to the buffer region for reading, a start address of the buffer region for reading is notified to the reading request source image processing module 38 to serve as the start address of a reading region, and a request is made that the image data be sequentially read from the start address. Hence, the reading request source image processing module 38 carries out reading of the image data from the reading region whose start address has been notified (i.e., the buffer region for reading). Here, if the effective data of the reading object is data corresponding to the end of effective data of the processing object, at the time of the reading request of the image data, the size of the image data of the reading object and the end of the image data of the processing object are both notified to the reading request source image processing module 38. Further, if the subject module is a buffer module 40 as created by the application 32, memory regions used as the buffer 40A (a collection of unit buffer regions) are adjacent regions. Hence, the reservation of the buffer region for reading and the writing of image data of the reading object to the buffer region for reading may be omitted, and the following image processing module 38 may directly read the image data from the unit buffer regions.

As shown by the example in FIG. 6A, in a case in which a data amount of the effective data that is stored at the unit buffer region that stores image data of a start portion of the effective data is less than the unit reading data amount and the effective data of the reading object straddles more than one of the unit buffer regions, then the effective data of the current reading object is not necessarily stored at adjacent regions in actual memory (the memory 14). However, in the above-described data reading process, in such a case, as shown in FIGS. 6B and 6C, the image data of the reading object is temporarily written to the buffer region for reading, and then the image data is read from the buffer region for reading. Therefore, regardless of whether or not the image data of the reading object straddles plural unit buffer regions, notification of a region of reading to the reading request source image processing module 38 need only give notice of a start address thereof as described above.

When notification is given that reading of the image data from the reading region by the reading request source image processing module 38 has finished, the start address and size of the memory region that was reserved as the buffer region for reading are notified to the resource management section 46B, and that memory region is released by the resource management section 46B. A structure is also possible in which such buffer regions for reading are reserved at times of initialization of the buffer modules 40 and are released at times of erasure of the buffer modules 40. Further, in the effective data pointer corresponding to the reading request source image processing module 38, the pointer representing the start position of effective data is altered (updated) such that the start position of effective data indicated by this pointer moves downward by an amount corresponding to the unit reading data amount (see FIG. 6C).

Then, by referring to each effective data pointer corresponding to an individual following image processing module 38, it is determined from pointer alterations hitherto whether or not, among unit buffer regions that structure the buffer 40A, there is a unit buffer region from which reading of stored image data by each following image processing module 38 has completely finished, which is to say, a unit buffer region at which no effective data is stored. If this determination is negative, processing for checking the aforementioned reading queue (determination of whether or not reading request information is registered in the reading queue) is performed and then the data reading process ends. If there is a unit buffer region at which no effective data is stored, that unit buffer region is released by the resource management section 46B, after which the checking processing of the reading queue is performed, and the data reading process ends.

Meanwhile, if the data amount of effective data that has been stored at the buffer module 40 and that the image processing module 38 can read is less than the unit reading data amount and the end of the readable effective data is not the end of image data of the processing object (a case in which a lack of readable effective data is detected by (4) of FIG. 4B), then a data request requesting new image data is outputted to the workflow management section 46A ((5) in FIG. 4B). Hence, the reading request information extracted from the reading queue is again registered at (the start or end of) the original queue, after which the checking processing of the reading queue is carried out and the data reading process ends. At this time, a processing request is inputted by the workflow management section 46A to the image processing module 38 preceding the subject module. In this manner, until it is detected that a data amount of readable effective data is at least the unit reading data amount or that the end of readable effective data is the end of image data of the processing object, the corresponding reading request information is saved in the reading queue and periodically extracted, and execution of the requested processing is repeatedly attempted.

As will be described in more detail later, when a data request is inputted to the workflow management section 46A from a buffer module 40, the workflow management section 46A inputs a processing request to the image processing module 38 preceding the buffer module 40 that is the source of the data request ((6) in FIG. 4B). With the input of this processing request as a trigger, processing is carried out by the control section 38B of the preceding image processing module 38. When, as a result, the preceding image processing module 38 enters a state which is capable of writing image data to the buffer module 40, a writing request is inputted from the preceding image processing module 38, and the data writing process is carried out. Thus, image data is written from the image processing module 38 to the buffer 40A of the buffer module 40 ((7) and (8) in FIG. 4B). Hence, it is possible for the following image processing module 38 to carry out reading of image data from the buffer 40A ((9) in FIG. 4B).

The data reading processing described hereabove is a data reading process which is carried out by the buffer control sections 40B of the buffer modules 40 with the exclusive access control function which are incorporated in the image processing section 50 for parallel processing. Data reading processing which is carried out by the buffer control sections 40B of the buffer modules 40 without the exclusive access control function, which are incorporated in the image processing section 50 for sequential processing, is the same as the data reading process described above except in that processing corresponding to exclusion processing is not performed (that is, the processing which determines whether or not the buffer 40A is already being accessed, and if the buffer 40A is being accessed and reading request information is registered in the queue, starts a timer, and when the timer times out, determines again whether or not the buffer 40A is being accessed, and after processing of a single reading request has ended, checks whether any reading request information is left in the queue).

Next, image processing module-control processing (FIG. 7), which is respectively carried out by the control sections 38B of the individual image processing modules 38 when processing requests are inputted from the workflow management section 46A to the individual image processing modules 38 constituting the image processing section 50, will be described. Herein, structures of the image processing modules 38 are the same regardless of whether the image processing section 50 is for parallel processing or sequential processing. Herebelow, the image processing module-control processing will be described without distinguishing whether the image processing section 50 is for parallel processing or sequential processing.

In the image processing module-control processing, firstly, in step 219, on the basis of the type, contents and the like of image processing that the image processing engine 38A of a subject module is to perform, the size of a memory that the subject module is to use and whether or not the subject module is to use other resources are identified. Here, the memory that the image processing module 38 uses is principally memory which is required for the image processing engine 38A to carry out the image processing. However, if the preceding module is the image data provision section 22 or the following module is the image output section 24, memory for a buffer for temporarily storing image data during transfers of image data to and from the preceding or following module will be required. Further, in a case in which processing parameters include information such as a table or the like, a memory region will be required for storing this. Reservation of a memory region of the identified size is requested to the resource management section 46B, and a memory region reserved by the resource management section 46B is acquired through the resource management section 46B. Further, in a case in which another resource beside memory is required by (the image processing engine 38A of) the subject module, reservation of the other resource is requested to the resource management section 46B, and the other resource is acquired through the resource management section 46B.

Next, in step 220, if there is a module preceding the subject module (i.e., one of the buffer modules 40, the image data provision section 22, one of the image processing modules 38 or the like), data is requested from this preceding module (i.e., image data, processing results of an image process such as analysis, or the like). Then, in step 222, it is determined whether it is possible to acquire the data from the preceding module. If the determination of step 222 is negative, in step 224 it is determined whether or not notification has been given of the whole process ending. If the determination of step 224 is negative, control returns to step 222, and steps 222 and 224 are repeated until it is possible to acquire data from the preceding module. When the determination of step 222 is positive, in step 226 data is acquired from the preceding module. The acquired data is subjected to data acquisition processing, which writes the data to a memory region for temporary storage of data in the memory region that was acquired in step 219.

Now, in a case in which the module preceding the subject module is one of the buffer modules 40, when data is requested in the above step 220 (a reading request), if the data is in a state in which readable effective data is stored in the buffer 40A of the buffer module 40 to at least the unit reading data amount or the end of the readable effective data coincides with the end of image data of the processing object, the start address of a reading region is promptly notified from the buffer module 40 and a request is made for reading of the image data. If this status does not apply, the buffer module 40 will change to this status consequent to the image processing module 38 preceding the corresponding buffer module 40 writing image data to the buffer 40A thereof, and then the start address of the reading region is notified from the buffer module 40 and a request is made for reading of the image data. Hence, the determination of step 222 is positive and control advances to step 226. In step 226, data in the unit reading data amount (or a smaller data amount) is read from the reading region whose start address has been notified by the preceding buffer module 40, and the data acquisition processing for writing the image data to the memory region for temporary storage is carried out ((3) in FIG. 4A).

If the module preceding the subject module is the image data provision section 22, then when the data request is outputted in the above step 220, notification is promptly given from the preceding image data provision section 22 of a status in which acquisition of image data is possible, the determination of step 222 is positive and control advances to step 226. In step 226, the image data is acquired from the preceding image data provision section 22 in the unit reading data amount, and the image data acquisition processing is carried out for writing the image data to the memory region for temporary storage. If the module preceding the subject module is one of the image processing modules 38, then when the data request (i.e., a processing request) is outputted in the above step 220, if the preceding image processing module 38 is in a state in which execution of image processing is possible, notification is given of the state in which data (or an image processing result) can be acquired by input of a writing request. Hence, the determination of step 222 is positive and control advances to step 226. In step 226, an address of the memory region for temporary storage to which data is to be written by the preceding image processing module 38 is notified, a request is made for writing, and data acquisition processing which writes the data outputted from the preceding image processing module 38 to the memory region for temporary storage is carried out.

Next, in step 228, it is determined whether or not plural modules at the preceding stage are connected to the subject module. If this determination is negative, control advances to step 232 without any processing being performed. If the determination is positive, control advances to step 230, and it is determined whether or not data has been acquired from all the connected modules in the preceding stage. If the determination of step 230 is negative, control returns to step 220, and steps 220 to 230 are repeated until the determination of step 230 is positive. When data that is to be acquired from the preceding module(s) has all been gathered, the determination of step 228 is negative or the determination of step 230 is positive, and control advances to step 232.

Next, in step 232, a region for data output to a module following the subject module is requested, and in step 234, a determination is repeatedly performed until it is possible to acquire the data output region (i.e., until a start address of the data output region is notified). Here, if the following module is one of the buffer modules 40, the above-mentioned request for the region for data output is implemented by outputting a writing request to that buffer module 40. When the data output region (i.e., if the following module is the buffer module 40, the writing region whose start address is notified from the buffer module 40) has been acquired ((4) in FIG. 4A), then in a next step 236, the data acquired by the above data acquisition processing, (the start address of) the data output region acquired from the following module and, of the memory region acquired in the above step 219, (a start address and size of) a memory region for image processing by the image processing engine are inputted to the image processing engine 38A. Then, predetermined image processing is carried out on the inputted image data using the memory region for image processing ((5) in FIG. 4A) and processed data is written to the data output region ((6) in FIG. 4A). When input of data in the unit reading data amount to the image processing engine 38A is complete and the data to be outputted from the image processing engine 38A has all been written to the data output region, in a next step 238, the following module is notified that output has finished.

Processing of data in the unit processing data amount (unit processing) at the image processing module 38 is completed by the above-described steps 220 to 238. However, in a processing request which is inputted from the workflow management section 46A to the image processing module 38, a number of executions of unit processing is specified by the workflow management section 46A. Accordingly, in step 240, it is determined whether or not a number of executions of unit processing has reached the number of executions indicated by the inputted processing request. If the indicated number of executions of unit processing is one, this determination will be unconditionally positive. However, if the indicated number of executions of unit processing is two or more, control returns to step 220, and steps 220 to 240 are repeated until the determination of step 240 is positive. When the determination of step 240 is positive, control advances to step 242. In step 242, a processing completion notification is outputted to the workflow management section 46A, and thus the workflow management section 46A is notified that processing corresponding to the inputted processing request is complete. In step 243, the memory region used for the processing is released, and the image processing module-control processing ends.

When image data has been processed to the end of the processing object by repeating the processing described above each time a processing request is inputted from the workflow management section 46A, notification is given from the preceding module of the end of the image data of the processing object. Accordingly, the determination of step 224 is positive and control advances to step 244. In step 244, notification of the end of the whole processing, indicating that processing of image data of the processing object has finished (herein, image data of a processing object will often be image data of a single page, but could also be image data of plural pages) is outputted to each of the workflow management section 46A and the following module(s). Then, in step 246, release of all the resources that were acquired is requested, processing for erasing the subject module is carried out, and the image processing module-control processing ends.

Figure 8A:
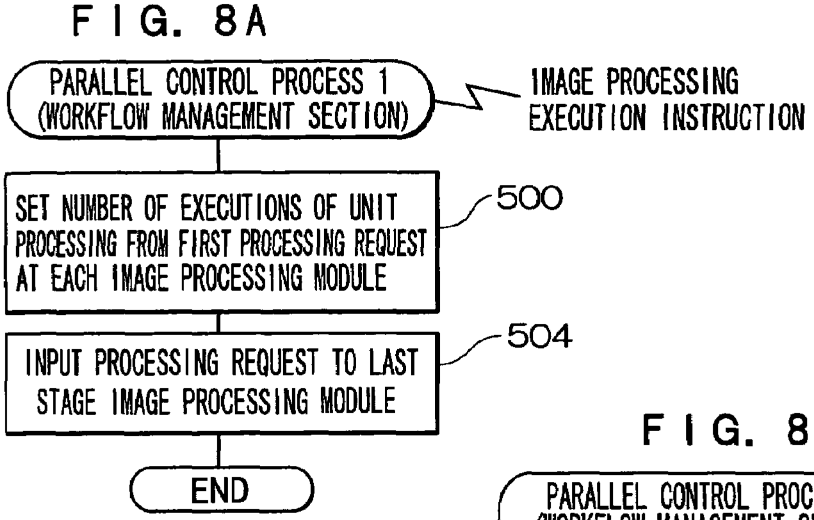
FIGS. 8A, 8B, 8C and 8D are flowcharts showing details of parallel control processing which is executed by a workflow management section of a parallel processing management section.

Now, if the operating processing management section 46 is a parallel processing management section, when execution of image processing is instructed, the workflow management section 46A carries out parallel control process 1 shown in FIG. 8A. As has been described above, in input by the workflow management section 46A of processing requests to the individual image processing modules 38 of the image processing section 50, numbers of executions of unit processing can be specified. In step 500 of the parallel control process 1, a number of executions of unit processing indicated by a first processing request is set for each of the individual image processing modules 38. This number of execution cycles of unit processing for one cycle of processing requests can be determined such that, for example, numbers of inputs of processing requests to the individual image processing modules 38 are uniform over processing of all image data of the processing object, and may be established in accordance with other principles. Then, in step 504, a processing request is inputted to the image processing module 38 at the last stage of the image processing section 50 ((1) in FIG. 9), and the parallel control process 1 ends.

Figure 9:
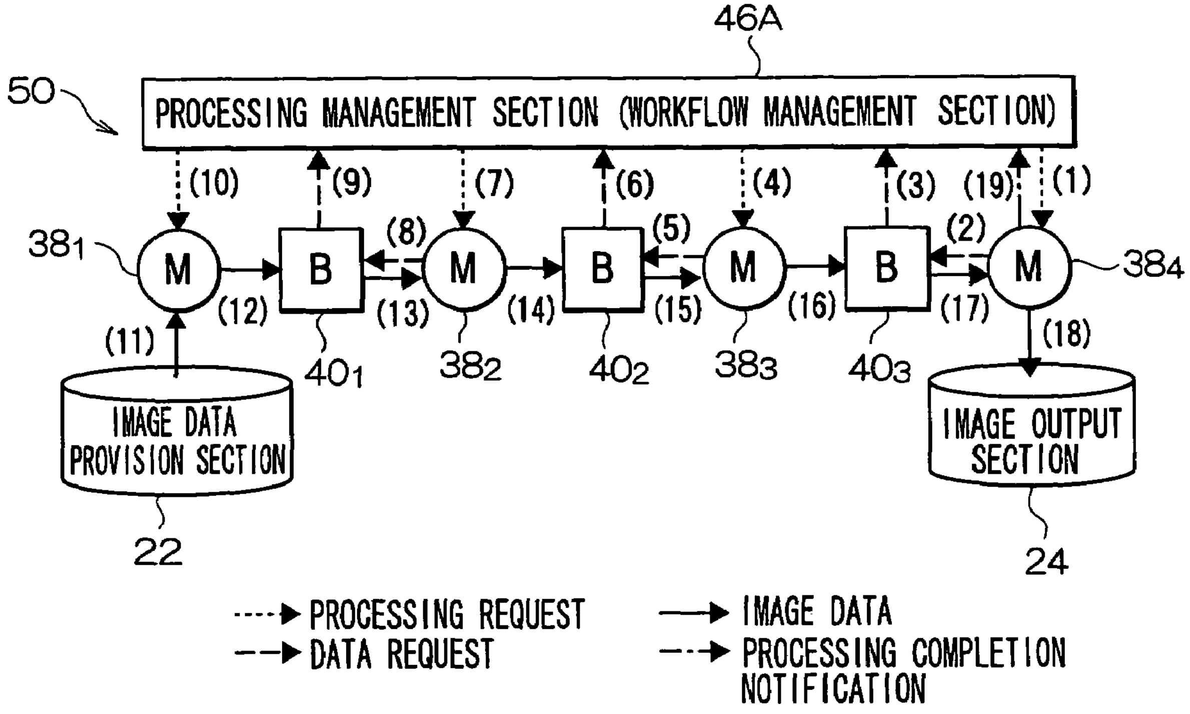
FIG. 9 is a schematic diagram describing a flow of image processing at an image processing section.
Figure 10A:
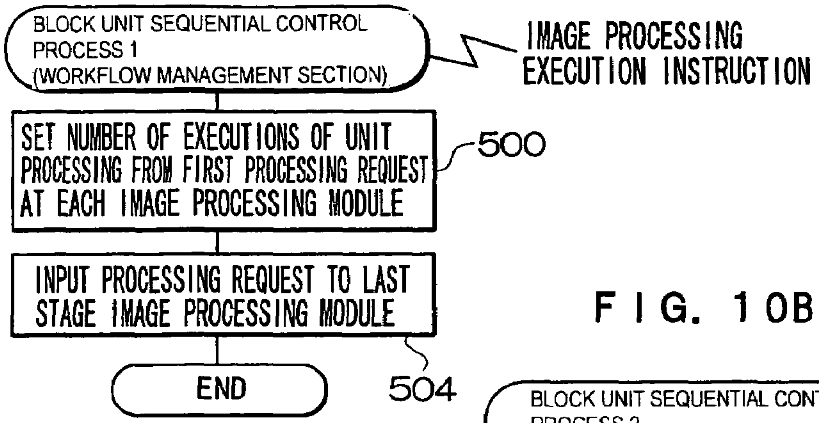
FIGS. 10A, 10B, 10C and 10D are flowcharts showing details of block unit sequential control processing which is executed by a workflow management section of a sequential processing management section.
Figure 10B:
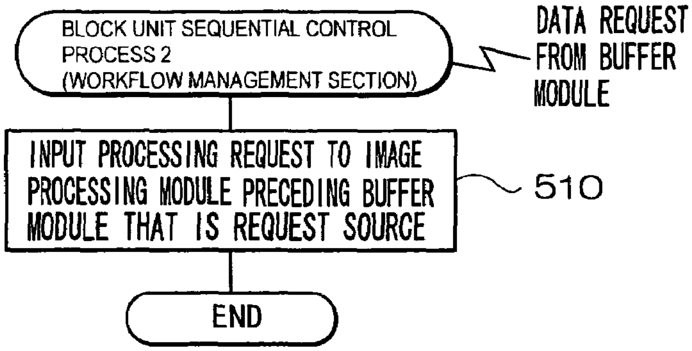
Figure 10C:
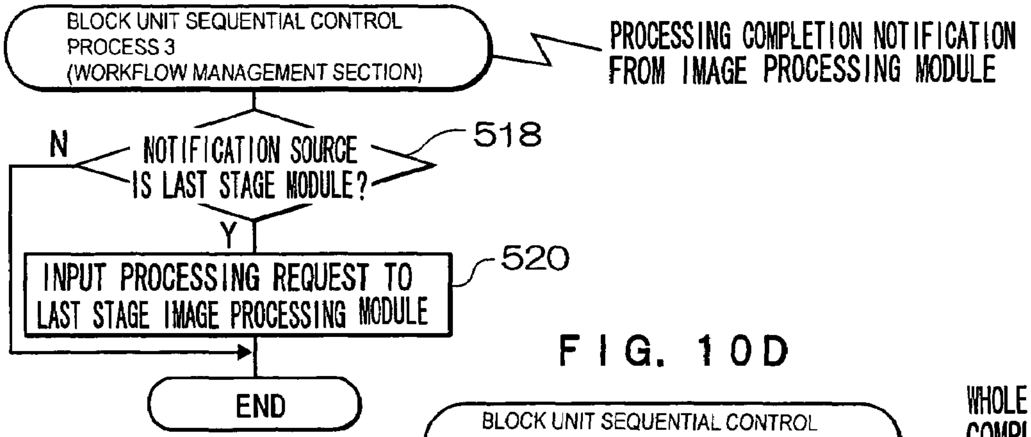
Figure 10D:
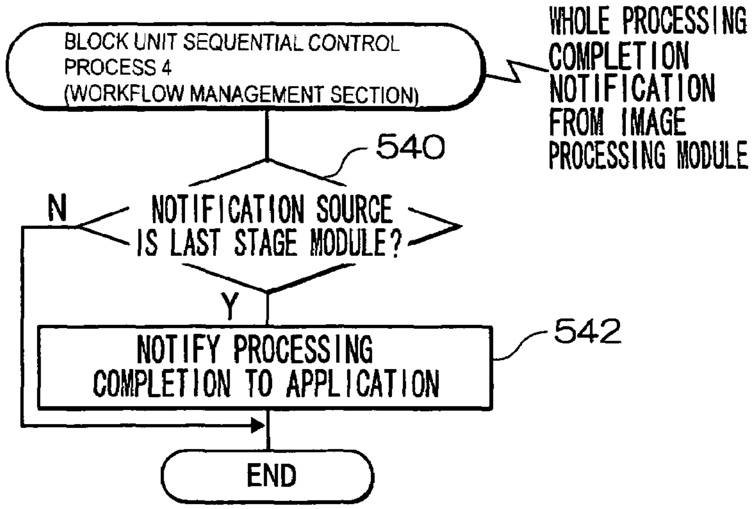

In the image processing section 50 shown in FIG. 9, when the processing request is inputted from the workflow management section 46A to the image processing module $\mathbf{38}_4$ at the last stage, the control section 38B of the image processing module $\mathbf{38}_4$ inputs a reading request to the preceding buffer module $\mathbf{40}_3$ ((2) in FIG. 9). At this time, the buffer module $\mathbf{40}_3$ has not stored effective data (image data) that the image processing module $\mathbf{38}_4$ can read at the buffer 40A. Therefore, the buffer control section 40B of the buffer module $\mathbf{40}_3$ inputs a data request to the workflow management section 46A ((3) in FIG. 9).

Figure 8B:
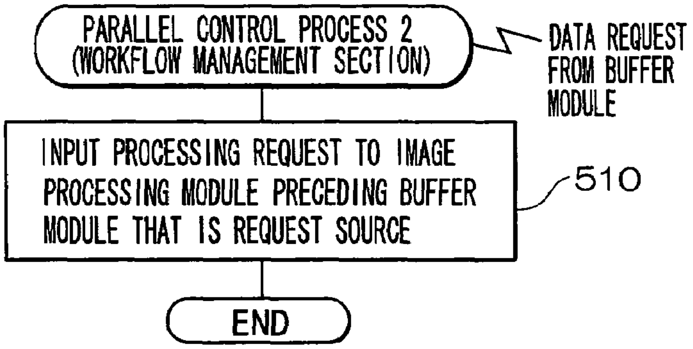
Figure 8C:
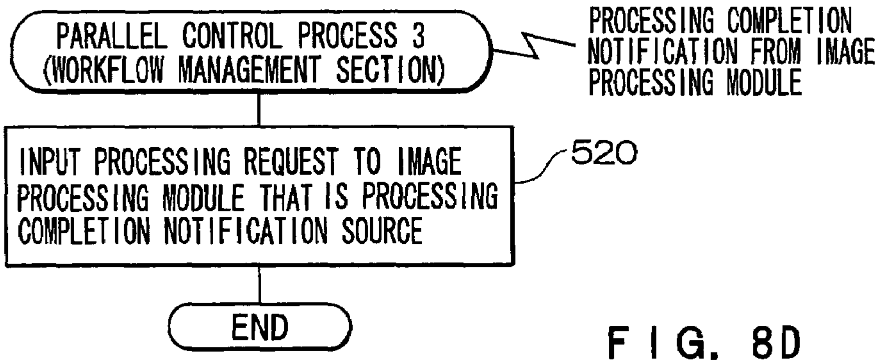

The workflow management section 46A of the parallel processing management section performs parallel control process 2 shown in FIG. 8B each time a data request is inputted from a buffer module 40. In this parallel control process 2, in step 510, the image processing module 38 (here, the image processing module $\mathbf{38}_3$) preceding the buffer module 40 that is the source of input of the data request (here, the buffer module $\mathbf{40}_3$) is identified, a processing request is inputted to the identified preceding image processing module 38 ((4) in FIG. 9), and the processing ends.

When this processing request is inputted, the control section 38B of the image processing module $\mathbf{38}_3$ inputs a reading request to the preceding buffer module $\mathbf{40}_2$ ((5) in FIG. 9). Because readable image data has not been stored at the buffer 40A of the buffer module $\mathbf{40}_2$ either, the buffer control section 40B of the buffer module $\mathbf{40}_2$ inputs a data request to the workflow management section 46A ((6) in FIG. 9). The workflow management section 46A performs the above-described parallel control process 2 again when the data request is inputted from the buffer module $\mathbf{40}_2$, and a processing request is inputted to the preceding image processing module $\mathbf{38}_2$ ((7) in FIG. 9). The control section 38B of the image processing module $\mathbf{38}_2$ inputs a reading request to the preceding buffer module $\mathbf{40}_1$ ((8) in FIG. 9). Further, because readable image data has not been stored at the 40A of the buffer module $\mathbf{40}_1$ the buffer control section 40B of the buffer module $\mathbf{40}_1$ inputs a data request to the workflow management section 46A ((9) in FIG. 9). The workflow management section 46A performs the above-described parallel control process 2 again when this data request is inputted from the buffer module $\mathbf{40}_1$, and a processing request is inputted to the preceding image processing module $\mathbf{38}_1$ ((10) in FIG. 9).

Now, because the module preceding the image processing module $\mathbf{38}_1$ is the image data provision section 22, the control section 38B of the image processing module $\mathbf{38}_1$ acquires image data in the unit reading data amount from the image data provision section 22 by inputting a data request to the image data provision section 22 ((11) in FIG. 9). The control section 38B of the image processing module $\mathbf{38}_1$ writes image data that is obtained by the image processing engine 38A performing image processing on the acquired image data to the buffer 40A of the following buffer module $\mathbf{40}_1$ (see (12) in FIG. 9).

Then, when the buffer control section 40B of the buffer module $\mathbf{40}_1$ has written effective data which the following image processing module $\mathbf{38}_2$ can read in at least the unit reading data amount, the buffer control section 40B makes a request for reading to the image processing module $\mathbf{38}_2$. Accordingly, the control section 38B of the image processing module $\mathbf{38}_2$ reads image data in the unit reading data amount from the buffer 40A of the buffer module $\mathbf{40}_1$ ((13) in FIG. 9). Image data which is obtained by the image processing engine 38A performing image processing on the thus-acquired image data is written to the buffer 40A of the following buffer module $\mathbf{40}_2$ ((14) in FIG. 9). When the buffer control section 40B of the buffer module $\mathbf{40}_2$ has written effective data which the following image processing module $\mathbf{38}_3$ can read in at least the unit reading data amount, the buffer control section 40B makes a request for reading to the image processing module $\mathbf{38}_3$. The control section 38B of the image processing module $\mathbf{38}_3$ reads image data in the unit reading data amount from the buffer 40A of the buffer module $\mathbf{40}_2$ ((15) in FIG. 9). Image data which is obtained by the image processing engine 38A performing image processing on the thus-acquired image data is written to the buffer 40A of the following buffer module $\mathbf{40}_3$ ((16) in FIG. 9).

Further, when the buffer control section 40B of the buffer module $\mathbf{40}_3$ has written effective data which the following image processing module $\mathbf{38}_4$ can read in at least the unit reading data amount, the buffer control section 40B makes a request for reading to the image processing module $\mathbf{38}_4$. Accordingly, the control section 38B of the image processing module $\mathbf{38}_4$ reads image data in the unit reading data amount from the buffer 40A of the buffer module $\mathbf{40}_3$ ((17) in FIG. 9). Image data which is obtained by the image processing engine 38A performing image processing on the thus-acquired image data is outputted to the image output section 24, which is the following module ((18) in FIG. 9).

When the control sections 38B of the individual image processing modules 38 have finished writing image data to the buffers 40A of the following buffer modules 40, the control sections 38B input processing completion notifications to the workflow management section 46A. Each time a processing completion notification is inputted from an image processing module 38, the workflow management section 46A of the parallel processing management section carries out parallel control process 3 shown in FIG. 8C. In this parallel control process 3, in step 520, a processing request is again inputted to the image processing module 38 that is the source of the processing completion notification, and the process ends.

Thus, in the parallel control processing by the workflow management section 46A of the parallel processing management section, each time completion of processing is notified from any of the image processing modules 38, a processing request is again inputted to the image processing module 38 that is the source of the processing completion notification. Thus, image data of the processing object is sequentially passed from preceding modules to following modules in units of a size (a block) smaller than an amount corresponding to an image plane, and image processing is carried out on the image data of the processing object by a parallel processing system in which the individual image processing modules 38 carry out image processing in parallel with one another. Then, when the image data being supplied from the image data provision section 22 reaches the end of image data of the processing object, inputs of whole processing completion notifications from the individual image processing modules 38 to the workflow management section 46A are performed sequentially by the image processing modules 38 in order from the preceding side.

Figure 8D:
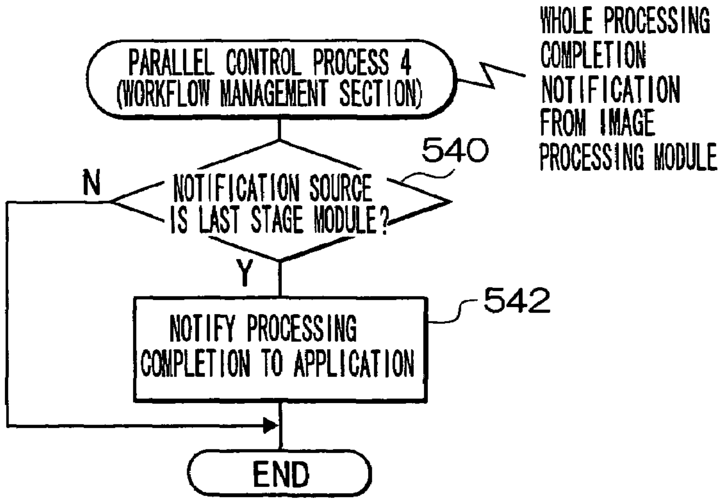

Each time a whole processing completion notification is inputted from an image processing module 38, the workflow management section 46A of the parallel processing management section carries out parallel control process 4 shown in FIG. 8D. In this parallel control process 4, in step 540, it is determined whether or not the image processing module 38 that is the source of input of the whole processing completion notification is the image processing module 38 at the last stage. If this determination is negative, the process ends without any further processing being carried out. However, when image data for which the required image processing has been carried out on all of the image data of the processing object has been outputted to the image output section 24, and the whole processing completion notification has been inputted from the image processing module 38 at the last stage, the determination of step 540 is positive and control advances to step 542. In step 542, completion of the image processing is notified to the application 32 (also in step 178 in FIG. 2), and the parallel control process 4 ends. Then, the application 32 which has been notified of the completion of image processing notifies the user of the completion of image processing (step 180 in FIG. 2). Herein, the parallel control management section which carries out the above-described parallel control processes 1 to 4 corresponds to a parallel processing control section.

Next, processing which is carried out by the workflow management section 46A in a case in which the operating processing management section 46 is the sequential control processing management section will be described. The workflow management section 46A of the sequential processing management section carries out a block unit sequential control process 1 shown in FIG. 10A when execution of image processing is instructed; each time a data request is inputted from one of the buffer modules 40, the workflow management section 46A carries out a block unit sequential control process 2 shown in FIG. 10B; each time a processing completion notification is inputted from one of the image processing modules 38, the workflow management section 46A carries out a block unit sequential control process 3 shown in FIG. 10C; and each time a whole processing completion notification is inputted from one of the image processing modules 38, the workflow management section 46A carries out a block unit sequential control process 4 shown in FIG. 10D. Of these, the block unit sequential control processes 1, 2 and 4 are the same as the parallel control processes 1, 2 and 4 described above, and therefore descriptions thereof will not be given, and the block unit sequential control process 3 which is carried out each time a processing completion notification is inputted from an image processing module 38 will be described.

In this block unit sequential control process 3, firstly, in step 518, it is determined whether or not the image processing module 38 that is the source of the processing completion notification is the image processing module 38 at the last stage. If this determination is negative, the block unit sequential control process 3 ends without performing any further processing. If this determination is positive, control advances to step 520, a processing request is again inputted to the image processing module 38 that is the source of the processing completion notification, and the process ends.

Therefore, with the block unit sequential control processes of the workflow management section 46A of the sequential processing management section, a processing request that is inputted to the image processing module 38 at the last stage of the image processing section 50 is transferred back to the preceding image processing modules 38. When the request reaches the image processing module 38 at a first stage, image processing on data of a size (a block) smaller than a single image plane is sequentially carried out from the image processing module 38 at the first stage (i.e., image processing is always carried out only at one of the image processing modules 38, and the image processing module 38 that is carrying out image processing is sequentially switched. When image processing of the data by the image processing module 38 at the last stage ends, a processing request is again inputted to the image processing module 38 at the last stage. With the sequential processing system in which all this is repeated, image processing is carried out on image data of the processing object. Herein, the sequential processing management section which carries out the block unit sequential control processes 1 to 4 described above corresponds to a first sequential processing control section.

While the workflow management section 46A is performing control such that image processing is carried out by the parallel processing system or sequential processing system as described above at the image processing section 50, the error management section 46C of the processing management section 46 also operates. When an error occurs at any of the image processing modules 38 of the image processing section 50, an error occurrence notification from the image processing module 38 at which the error has occurred is inputted to the error management section 46C. When an error occurrence notification is inputted, the error management section 46C acquires error information of the type of error that has occurred and suchlike. The error management section 46C also acquires device environment information, which represents a type, structure and the like of the device at which the computer 10 in which the image processing program group 34 is installed is incorporated, from the storage section 20 or the like. An error notification method is determined in accordance with the device environment that the device environment information represents, and error notification processing for notifying of the occurrence of the error is performed by the determined error notification method.

When the image processing section 50 is performing image processing with the sequential processing system, image processing is continually carried out only at one of the image processing modules 38. Therefore, inputs of error occurrence notifications from plural image processing modules 38 to the error management section 46C simultaneously or nearly simultaneously will not occur. Furthermore, the programs of the individual modules structuring the image processing section 50 are executed as a single thread. Therefore, if a serious error occurs at one of the image processing modules 38 and the image processing thereof stops, the whole of the image processing being carried out by the image processing section 50 stops accordingly. In contrast, when the image processing section 50 is carrying out image processing with the parallel processing system, the individual image processing modules 38 are performing image processing in parallel. Therefore, it is possible that error occurrence notifications will be inputted to the error management section 46C from the plural image processing modules 38 simultaneously or nearly simultaneously. In addition, the programs of the individual modules structuring the image processing section 50 are executed as mutually separate threads. Therefore, even if a serious error occurs at one of the image processing modules 38 and the image processing thereof stops, image processing can continue at the other image processing modules 38 of the image processing section 50.

Accordingly, the error management section 46C of the processing management section 46 performs exclusion processing such that a failure will not occur in a case in which error occurrence notifications are inputted from plural image processing modules 38 simultaneously or nearly simultaneously. The error management section 46C also performs processing for, in a case in which a serious error occurs at one of the image processing modules 38 and the image processing thereof stops, notifying the occurrence of this error to the other image processing modules 38 of the image processing section 50 and stopping executions of image processing thereat, and stopping execution of all threads corresponding to the individual modules of the image processing section 50. Thus, even when the image processing section 50 is carrying out image processing with the parallel processing system, error processing can be carried out without breakdowns.

Thus, the parallel processing management section 46 is provided with the error management section 46C for performing error processing that is suitable for a parallel processing system, and the sequential processing management section 46 is provided with the error management section 46C for performing error processing that is suitable for a sequential processing system. The error management section 46C to be operated is automatically switched in accordance with the selective activation by the selection activation section 45 of the parallel processing management section 46 or the sequential processing management section 46.

Now, processing by the workflow management section 46A when the image processing section 50 is being operated with a parallel processing system is not limited to the parallel control processes 1 to 4 illustrated in FIGS. 8A to 8D. Even when the image processing section 50 is being operated with a parallel processing system, progress of image processing at the individual image processing modules 38 is dependent on conditions of progress of image processing at the image processing modules 38 in relatively preceding positions. Particularly at a time of commencement of execution of a series of image processing in the image processing section 50 or a period close to the commencement, processing efficiency will be relatively improved if image processing is executed with priority given to, of the image processing modules 38, image processing modules that are at preceding side positions of a pipeline form or directed acyclic graph form.

Furthermore, progress of image processing will always be later at the image processing modules 38 at the following side than at the preceding side, and remaining amounts of image data of the processing object will always be larger for the image processing modules 38 at the following side. Therefore, processing efficiency will be improved if execution priorities of image processing at image processing modules in following side positions are raised in accordance with the progress of a series of image processing in the image processing section. Particularly at a time of completion of execution of a series of image processing in the image processing section or a period close to the completion, raising execution priorities of image processing at the image processing modules in following side positions in accordance with the image processing modules 38 for which all processing has ended progressively becoming more numerous from the preceding side is desirable in regard to processing efficiency. When the image processing section 50 is operated with a parallel processing system on this basis, the workflow management section 46A may specify and alter execution priorities of the threads corresponding to the individual image processing modules 38 of the image processing section 50 as shown by the example in FIGS. 11A to 11D.

That is, in the parallel control processing shown in FIGS. 11A to 11D, in step 500, a number of executions of unit processing indicated by a first processing request is set for each of the individual image processing modules 38. Thereafter, in a following step 502, initial setting of execution priorities of the individual threads corresponding to the individual image processing modules 38 is carried out such that the execution priorities of the individual threads are higher at the image processing modules 38 toward the preceding side of the connection form, which is a pipeline form or a directed acyclic graph form, as shown by the example in FIG. 12A.

Figure 13A:
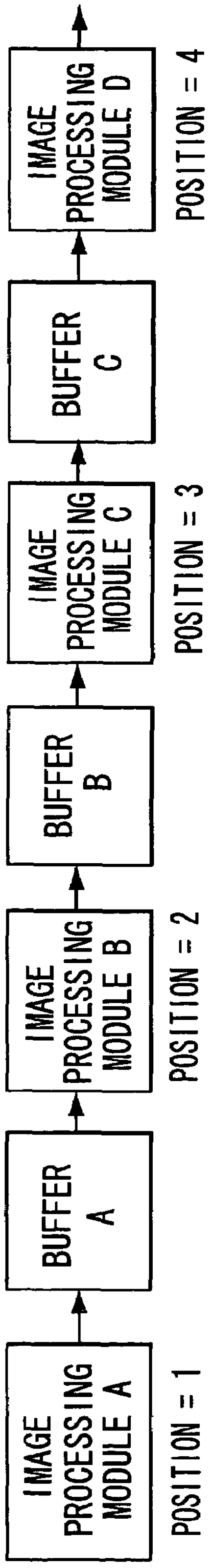
FIGS. 13A and 13B are block diagrams for describing definition of positions of image processing modules in connection forms which are a pipeline form or a directed acyclic graph form.
Figure 13B:
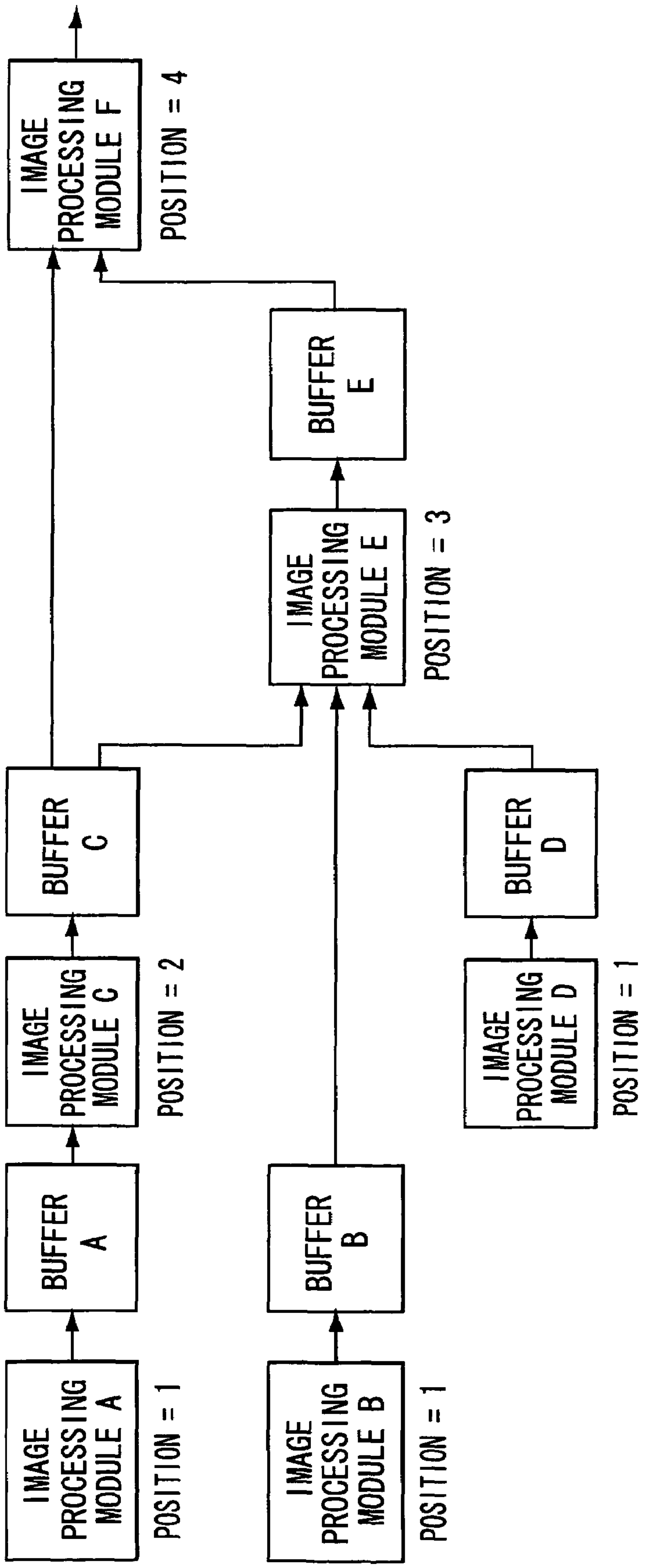

Here, the "positions of the image processing modules 38" referred to above can be determined on the basis of position values which, if, for example, the image processing system has a pipeline form, are assigned in ascending order from the image processing module 38 at the start (the first stage) as shown in FIG. 13A (or alternatively position values which are assigned in descending order from the image processing module 38 at the far end (the last stage)). If the image processing section has a directed acyclic graph form, then, as shown in FIG. 13B, position values are assigned in ascending order from the image processing module 38 at the start (the first stage) (or alternatively in descending order from the image processing module 38 at the far end (the last stage)) with an image processing module 38 which acquires image data from plural other image processing modules via buffer modules (such as image processing module E in the example shown in FIG. 13B) being assigned a position value based on a maximum value (or minimum value) of the position values assigned to the plural preceding image processing modules, and the "positions of the image processing modules 38" can be determined on the basis of these position values.

Further, making execution priorities of corresponding threads higher in accordance with positions of the image processing modules 38 toward the preceding side in a connection form which is a pipeline form or a directed acyclic graph form can be realized as follows. If, for example, execution priorities which can be set for threads of image processing modules are in nine levels, from 1 to 9, and position values for the individual units are set in ascending order from the preceding side with a starting value of 1, then the threads corresponding to the individual image processing modules 38 may be set as follows:

$$\text{execution priority}=10-(\text{position value})$$

in which, if execution priority<1, then execution priority=1.

Alternatively, it is possible to set the execution priorities using a monotonically decreasing function (for example, a function in which execution priorities decrease linearly with respect to magnitudes of position values) such that an execution priority when the position value is a minimum value is 9 and an execution priority when the position value is a maximum value is 1. Hence, at a time at which a series of image processing is commenced by the image processing section, the image processing is executed by the CPU 12 with execution priorities being higher the further to the preceding side of the threads the positions of the corresponding image processing modules 38 are, in the connection form which is a pipeline form or a directed acyclic graph form.

Fixed execution priorities of threads corresponding to the buffer modules 40 may be set with certain priorities. Alternatively, an average value, a maximum value, a minimum value or the like of the execution priorities of the threads corresponding to image processing modules 38 that are connected preceding and following an individual buffer module 40 may be set therefor, and the execution priority of the thread corresponding to the individual buffer module 40 may be altered when the execution priorities of the threads corresponding to the individual image processing modules 38 are altered in accordance with degrees of progress of the image processing, as will be described below.

Figure 11A:
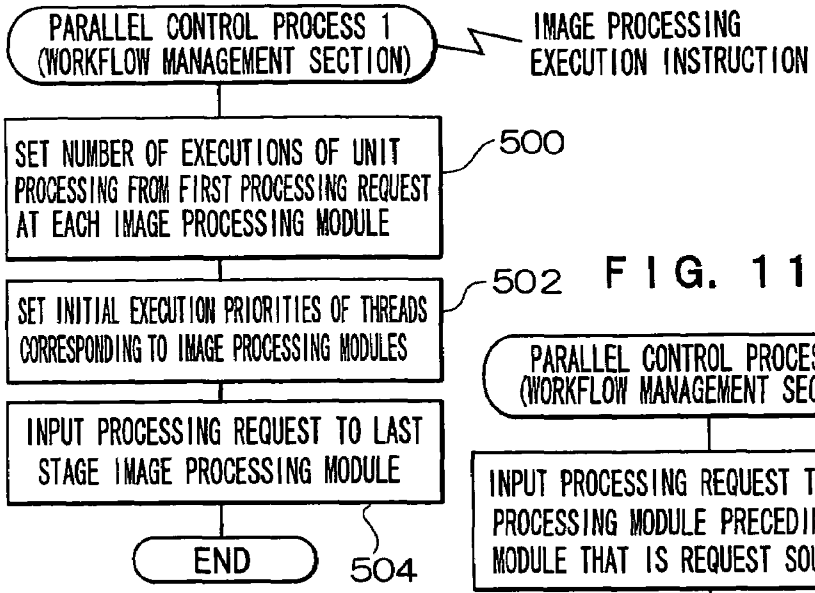
FIGS. 11A, 11B, 11C and 11D are flowcharts showing another example of details of parallel control processing which is executed by a workflow management section of a parallel processing management section.
Figure 11B:
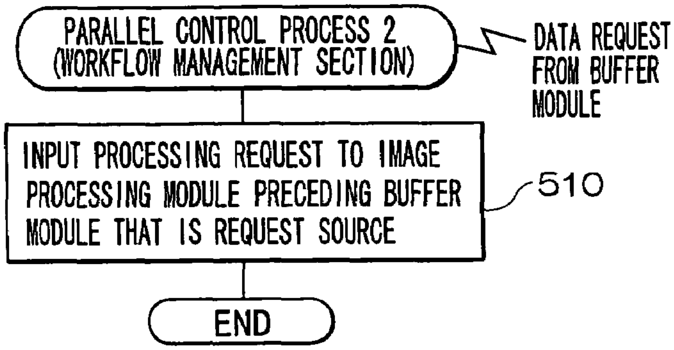
Figure 11C:
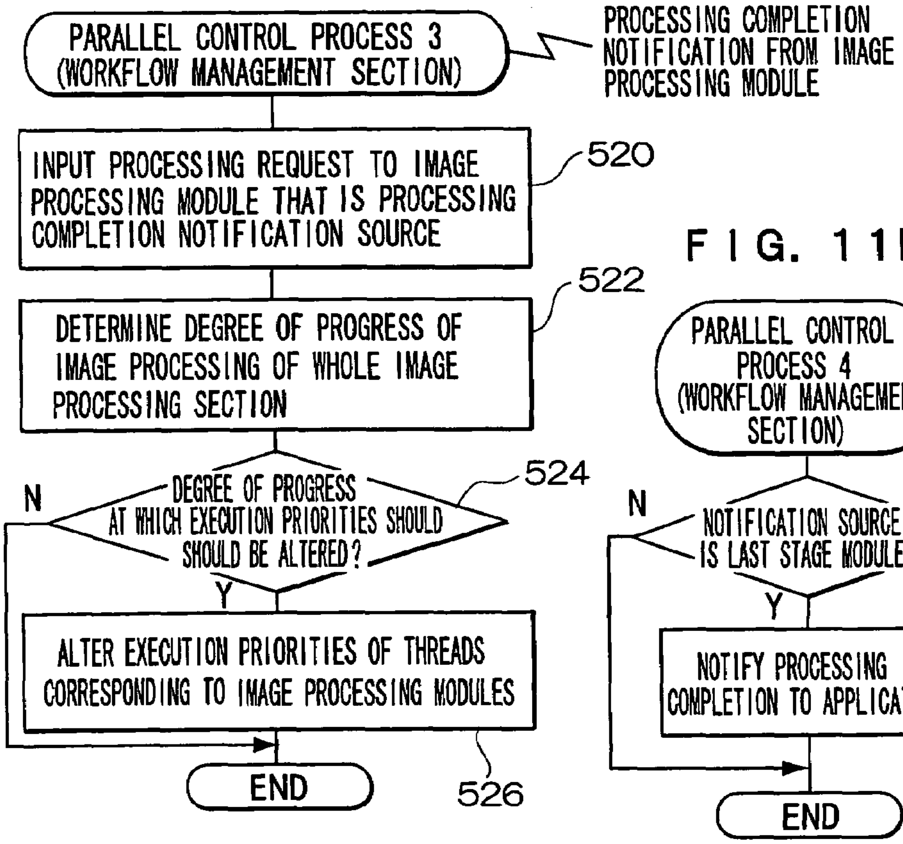
Figure 11D:
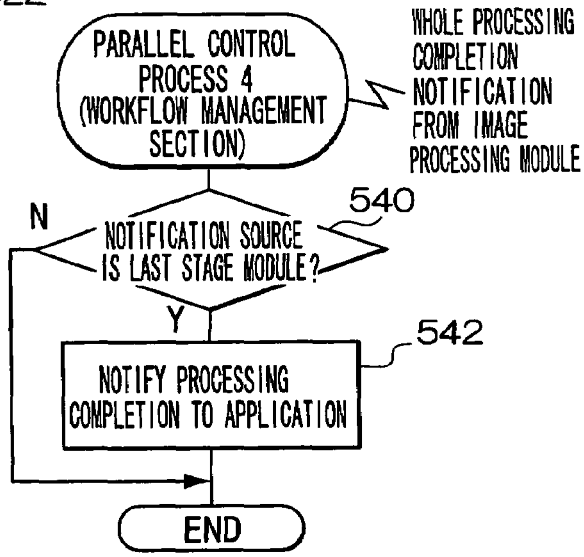

Of the parallel control processes shown in FIGS. 11A to 11D, parallel control process 3 is executed each time a processing completion notification is inputted from an image processing module 38 (FIG. 11C). In step 522 of parallel control process 3, a degree of progress of image processing of the image processing section 50 as a whole is determined. For this determination, for example, the individual image processing modules 38 are structured such that when a processing completion notification is sent from an individual image processing module 38 to the workflow management section 46A, progress information from which the degree of progress of information processing of the individual image processing module 38 can be judged is additionally sent. Each time a processing completion notification is received from an individual image processing module 38, the workflow management section 46A stores the progress information that is received at the same time (if progress information which was received from the same image processing module 38 was previously stored, the previously stored progress information is overwritten with the newly received progress information). Thereafter, it is possible to proceed by summing a degree of progress of image processing of the image processing section 50 as a whole from the progress information corresponding to the individual image processing modules 38.

The above-mentioned progress information is preferably information whose calculation adds as small a load as possible to the image processing modules 38 (i.e., the CPU 12 which executes the corresponding threads). For example, it is possible to utilize information representing a proportion of image data that has been processed at an individual image processing module 38 relative to the whole of the image data of the processing object (specifically, a ratio of data amounts, a ratio of line counts or the like). It is also possible to send information representing a data amount, line count or the like of processed image data from the individual image processing module 38 as the progress information, and calculate the degree of progress of image processing of the individual image processing module 38 (the above-mentioned ratio or the like) at the workflow management section 46A.

Next, in step 524, it is determined whether or not the degree of progress of image processing of the image processing section 50 as a whole, which has been determined in step 522, has reached a value at which the execution priorities of the threads corresponding to the individual image processing modules 38 are to be altered. Herein, there is no need to perform alterations of execution priorities very frequently. In order to avoid adding an excessive workload to the CPU 12 for performing alterations of execution priorities frequently, for judgement conditions in the determination of step 524, it is acceptable to utilize judgement conditions with which the execution priorities of threads are altered at intervals infrequent enough to not apply an excessive workload (for example, the determination being positive each time a degree of progress of image processing has increased by 10% from a previous time of alteration (or the initial setting) of the execution priorities of the threads).

If the above-mentioned determination is negative, the parallel control process 3 ends without performing any further processing. On the other hand, if the determination is positive, in step 526, the execution priority settings of the threads corresponding to the individual image processing modules 38 are altered such that, by reference to a central value (or average value) of execution priorities that were set for threads at the time of initial setting, execution priorities for each of threads whose execution priorities were set high at the time of initial setting are gradually lowered in accordance with progress of image processing and execution priorities for each of threads whose execution priorities were set low at the time of initial setting are gradually increased in accordance with progress of image processing. Then, the parallel control process 3 ends.

Figures 12A, 12B, 12C, 12D, 12E:
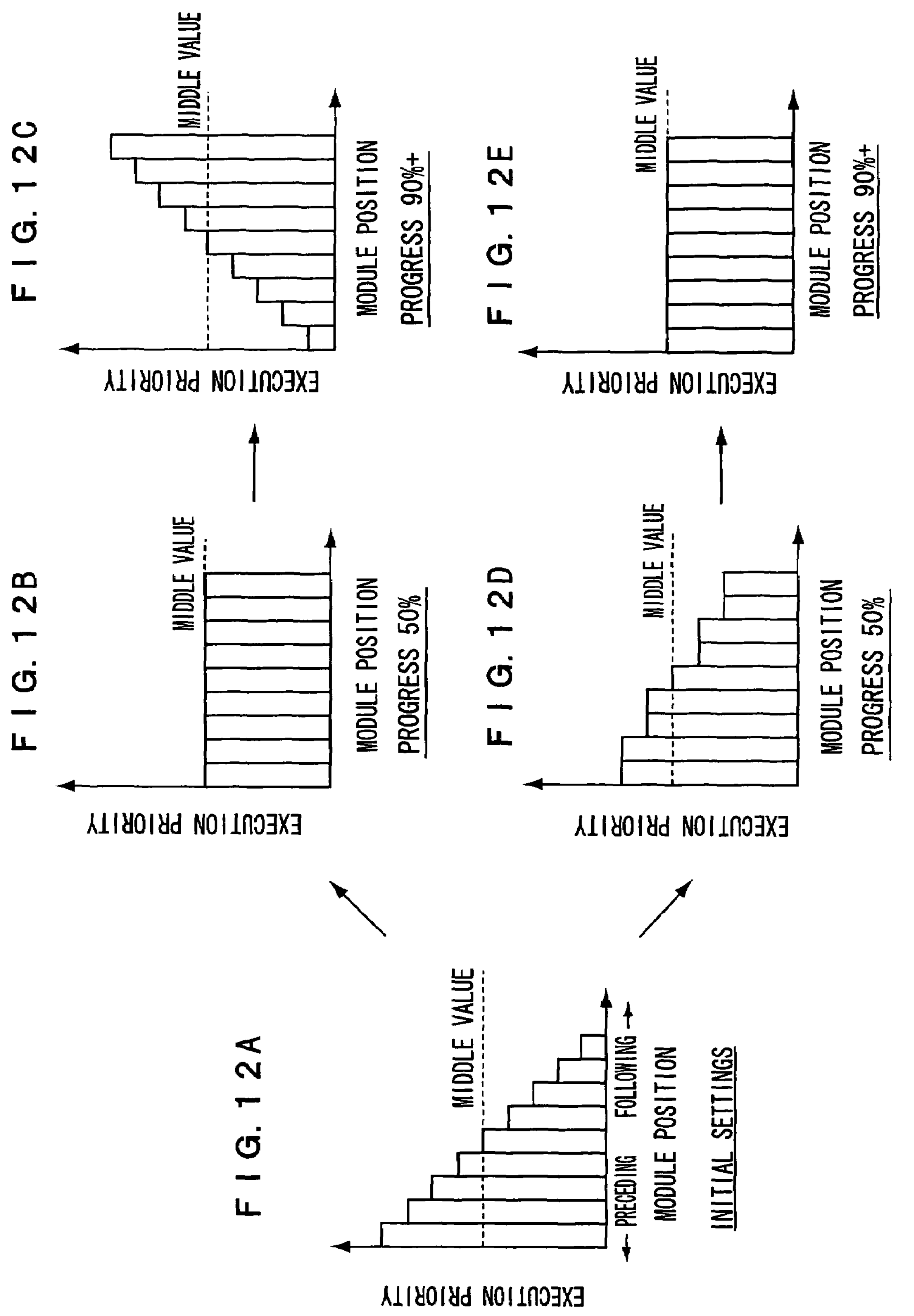
FIGS. 12A, 12B, 12C, 12D and 12E are schematic diagrams showing examples of shifts in execution priorities of threads corresponding to individual image processing modules, in accordance with progress of a series of image processing in an image processing section.

The alteration of execution priority in this step 528 may be carried out such that alteration amounts of execution priorities of corresponding threads are larger for positions of the image processing modules 38 which are closer to the first stage or the last stage and, as shown by the example in FIGS. 12B and 12C, such that at the end of image processing by the image processing section 50 as a whole, size relationships of execution priorities of threads corresponding to the image processing modules 38 at the preceding side and execution priorities of threads corresponding to the image processing modules 38 at the following side have been reversed. Alternatively, as shown by the example in FIGS. 12D and 12E, the alterations may be carried out such that at the end of image processing by the image processing section 50 as a whole, execution priorities of threads corresponding to the respective image processing modules 38 are uniform. By altering the execution priorities of the threads corresponding to the individual image processing modules 38 in accordance with the progress of image processing in the image processing section 50 as described above, it is possible to effectively utilize the CPU 12 and carry out the image processing with high processing efficiency. Herein, the processing management section 46 which initially sets and alters the execution priorities of the threads corresponding to the individual image processing modules 38 as described hereabove corresponds to a parallel processing control section.

The execution priorities of the individual threads corresponding to the individual image processing modules 38 are not limited to being initially set and altered as described above. For example, the execution priority of a thread corresponding to an individual image processing module 38 may be altered for the individual image processing module in accordance with a count of occurrences of waiting. The count of occurrences of waiting is a number of times that data requests are inputted from a following buffer module 40—when reading requests are inputted to the following buffer module 40 from an image processing module 38 that is connected following (i.e., following the subject module) via the following buffer module 40 (that is, an image processing module 38 of which a position value is the position value of the subject module+1)—because effective data stored in the following buffer module 40 is less than the unit reading data amount, and thus waiting occurs at the following image processing module (a state of waiting until effective data at the buffer module 40 is at least the unit reading data amount).

More specifically, the workflow management section 46A stores waiting occurrence counts (with initial values of 0) for the individual image processing modules 38 in advance. Each time a data request is inputted from any of the buffer modules 40, the waiting occurrence count for the image processing module 38 preceding the buffer module 40 that is the source of input of the data request is incremented by 1. The workflow management section 46A calculates an average value of the waiting occurrence counts that are stored for the individual image processing modules 38 at certain time intervals. The execution priorities of the threads corresponding to the image processing modules 38 are altered in accordance with differences between the calculated average of the waiting occurrence counts and the waiting occurrence counts of the individual image processing modules 38. The alterations of execution priorities may be carried out such that, for image processing modules 38 for which the waiting occurrence counts are larger than the average value, execution priorities of the corresponding threads are increased in accordance with the magnitudes of the differences thereof, and for image processing modules 38 for which the waiting occurrence counts are smaller than the average value, execution priorities of the corresponding threads are reduced in accordance with the magnitudes of the differences. More specifically, for example, the alterations can be performed in accordance with the following equation.

$$\text{Alteration ratio (\%) of execution priority} = (\text{waiting occurrence count} - \text{average value of waiting occurrence counts}) / \text{average value} \times 100$$

$$\text{Execution priority after alteration} = \text{execution priority} + (\text{execution priority} \times \text{alteration ratio}) / 100$$

For the above calculations, a middle value of the waiting occurrence counts may be utilized instead of the average value of the waiting occurrence counts.

For an image processing module 38 at which the waiting occurrence count is larger than the average value, it can be judged that ‘waiting’ will occur comparatively often at the following image processing module 38 which is connected via the following buffer module 40, and that image processing at that image processing module 38 will be a bottleneck in image processing by the image processing section as a whole. The execution priority of the thread corresponding to such an image processing module 38 is increased by the process described above. For an image processing module 38 at which the waiting occurrence count is smaller than the average value, a count of occurrences of ‘waiting’ at the following image processing module 38 which is connected via the following buffer module 40 is comparatively smaller. Therefore, image processing of the image processing section as a whole can be can be made more efficient if image processing at another image processing module 38, at which the waiting occurrence count is comparatively higher, is given priority over that image processing module 38. Accordingly, the execution priority of the thread corresponding to such an image processing module 38 is reduced.

Thus, execution priorities of the threads corresponding to the individual image processing modules 38 can be optimized in accordance with the waiting occurrence counts of the following image processing modules 38 (and the differences of the waiting occurrence counts from average values), the CPU 12 can be effectively utilized and image processing can be carried out with high processing efficiency. Furthermore, acquisition request information, which is registered in a memory acquisition queue, is arranged in accordance with the execution priorities which have been set as described above.

In the above-described mode, it is also possible to use a waiting occurrence count which is a count that adds a number of times at which an individual image processing module 38 has written image data to the following buffer module 40 but the effective data of the following buffer module 40 has not reached the unit reading data amount of a following image processing module 38, which is connected via the following buffer module 40, to the count of occurrences of inputs of data requests from the following buffer module 40, that is, the count of occurrences of 'waiting' at the following image processing module 38. Such a case this waiting occurrence count may more properly reflect a degree of 'waiting' at the following image processing module 38.

Further, in the above-described mode, in addition to altering the execution priority of the thread corresponding to an individual image processing module 38 in accordance with the count of occurrences of waiting at a following image processing module 38 which is connected via the following buffer module 40, it is also possible to alter the execution priority of the thread in accordance with a count of occurrences of waiting at the subject module. More specifically, it is possible to reduce the execution priorities for threads corresponding to image processing modules 38 at which the waiting occurrence counts are comparatively high and increase the execution priorities for threads corresponding to image processing modules 38 at which the waiting occurrence counts are comparatively low.

Further still, it is possible to alter the execution priority of the thread corresponding to an individual image processing module 38 in accordance with a ratio of a data amount of image data stored at an individual buffer module 40 to a unit reading data amount when an image processing module 38 following the individual buffer module 40 acquires image data from the individual buffer module 40. This can be realized by, for example, the workflow management section 46A performing the following processing at certain time intervals.

Firstly, accumulated data amounts that are present at the individual buffer modules 40 are acquired and, for the individual buffer modules 40, ratios of the accumulated data amounts present at the respective buffer modules 40 to the unit reading data amounts of the following image processing modules 38 are calculated. For example, if the accumulated data amounts are values representing numbers of lines of an image, and the accumulated data amount of a certain buffer module 40 is 10 lines and the unit reading data amount of an image processing module 38 following that buffer module 40 is 1 line, then the ratio of the accumulated data amount is 10/1=10. If the unit reading data amount of the following image processing module 38 were 8 lines, then the ratio of the accumulated data amount would be 10/8=1.25. An average value of the accumulated data amount ratios that have been calculated in this manner for the respective buffer modules 40 is calculated. The execution priorities of the threads corresponding to the image processing modules 38 preceding the individual buffer modules 40 are altered in accordance with differences between the calculated average value of the accumulated data amount ratios and the accumulated data amount ratios of the individual buffer modules 40.

This alteration of execution priorities can be carried out such that, for an image processing module 38 preceding a buffer module 40 at which the accumulated data amount ratio is smaller than the average value, the execution priority of the corresponding buffer module 40 is increased in accordance with the magnitude of the difference thereof, and for an image processing module 38 preceding a buffer module 40 at which the accumulated data amount ratio is larger than the average value, the execution priority of the corresponding buffer module 40 is reduced in accordance with magnitude of the difference. More specifically, this can be performed in accordance with, for example, the following equation.

Alteration ratio (%) of execution priority=(average value−accumulated data amount ratio)/average value×100

Execution priority after alteration=original execution priority+(execution priority×alteration ratio)/100

For the above calculations, a middle value of the accumulated data amount ratios may be utilized instead of the average value of the accumulated data amount ratios.

At a buffer module 40 at which the accumulated data amount ratio is smaller than the average value, data amounts of effective data are scarce relative to the unit reading data amount of the following image processing module 38, and there is a high possibility of a relatively high count of 'waiting' at the following image processing module 38. Moreover, there is a high possibility of image processing at the image processing module 38 preceding the buffer module 40 being a bottleneck in image processing of the image processing section as a whole. With the processing described above, the execution priority of the thread corresponding to such an image processing module 38 is increased. Meanwhile, at a buffer module 40 at which the accumulated data amount ratio is larger than the average value, data amounts of effective data which are plentiful relative to the unit reading data amount of the following image processing module 38 have been stored. Therefore, image processing of the image processing section as a whole can be made more efficient if image processing at the image processing module 38 preceding another buffer module 40, at which the accumulated data amount ratio is comparatively smaller, is given priority over the image processing module 38 preceding this buffer module. Accordingly, the execution priority of the thread corresponding to such an image processing module 38 is lowered by this processing.

Thus, execution priorities of the threads corresponding to the individual image processing modules 38 can be optimized in accordance with the accumulated data amount ratios of the following buffer modules 40 (and the differences of the accumulated data amount ratios from the average value). Accordingly, the CPU 12 can be effectively utilized and image processing can be carried out with high processing efficiency. Furthermore, the acquisition request information which is registered in the memory acquisition queue is arranged in accordance with the execution priorities which have been set as described above. Therefore, if requested memory regions cannot be reserved and execution of a number of threads is stopped, and thereafter the execution-stopped states of the threads are released by increasing reservable memory regions and assigning the requested memory regions, it is possible to carry out subsequent processing at the image processing section 50 with high processing efficiency.

Processing of the workflow management section 46A when the image processing section 50 is operated in a sequential processing system is not limited to the block unit sequential control processes 1 to 4 illustrated in FIGS. 10A to 10D. For example, it is also possible to perform plane unit sequential control processes 1, 3 and 4, which are shown in FIGS. 14A to 14C. In the plane unit sequential control processing shown in FIGS. 14A to 14C, when execution of image processing is instructed, firstly, in step 500 of the plane unit sequential control process 1 shown in FIG. 14A, a number of executions of unit processing designated by a first processings request is set for each individual image processing module 38. Next, in step 505, a processing request is inputted to the image processing module 38 at the first stage of the image processing section 50. Each time a processing completion notification is inputted from an image processing module 38, in step 520 of the plane unit sequential control process 3 shown in FIG. 14B, a processing request is again inputted to the image processing module 38 that is the source of the processing completion notification. In this manner, processing requests are repeatedly inputted to the image processing module 38 at the first stage of the image processing section 50.

Each time a whole processing completion notification is inputted from an image processing module 38, firstly, in step 540 of the plane unit sequential control process 4 shown in FIG. 14C, it is determined whether or not the image processing module 38 that is the source of the whole processing completion notification is the image processing module 38 of the last stage. If this determination is negative, control advances to step 544. In step 544, a processing request is inputted to an image processing module 38 for which a position of the image processing module 38 in the connection form, which is a pipeline form or a directed acyclic graph form, is at the next stage from the image processing module 38 that was the source of the whole processing completion notification. Thus, after an image processing module 38 that has been executing image processing finishes image processing of the image data of the processing object and the whole process completion notification is inputted from this image processing module 38, the image processing module 38 that is to execute image processing is switched to the image processing module 38 of the next stage. That is, image processing is performed on the image data of the processing object with a sequential processing system in which image processing of data in an amount corresponding to a single plane of an image is sequentially performed from the image processing module 38 of the first stage. Then, when a whole processing completion notification is inputted from the image processing module 38 of the last stage, the determination of step 540 is positive and completion of image processing is notified to the application 32 in step 542. Herein, the sequential processing management section which carries out the above-described plane unit sequential control processes 1, 3 and 4 corresponds to a second sequential processing control section.

Figure 15:
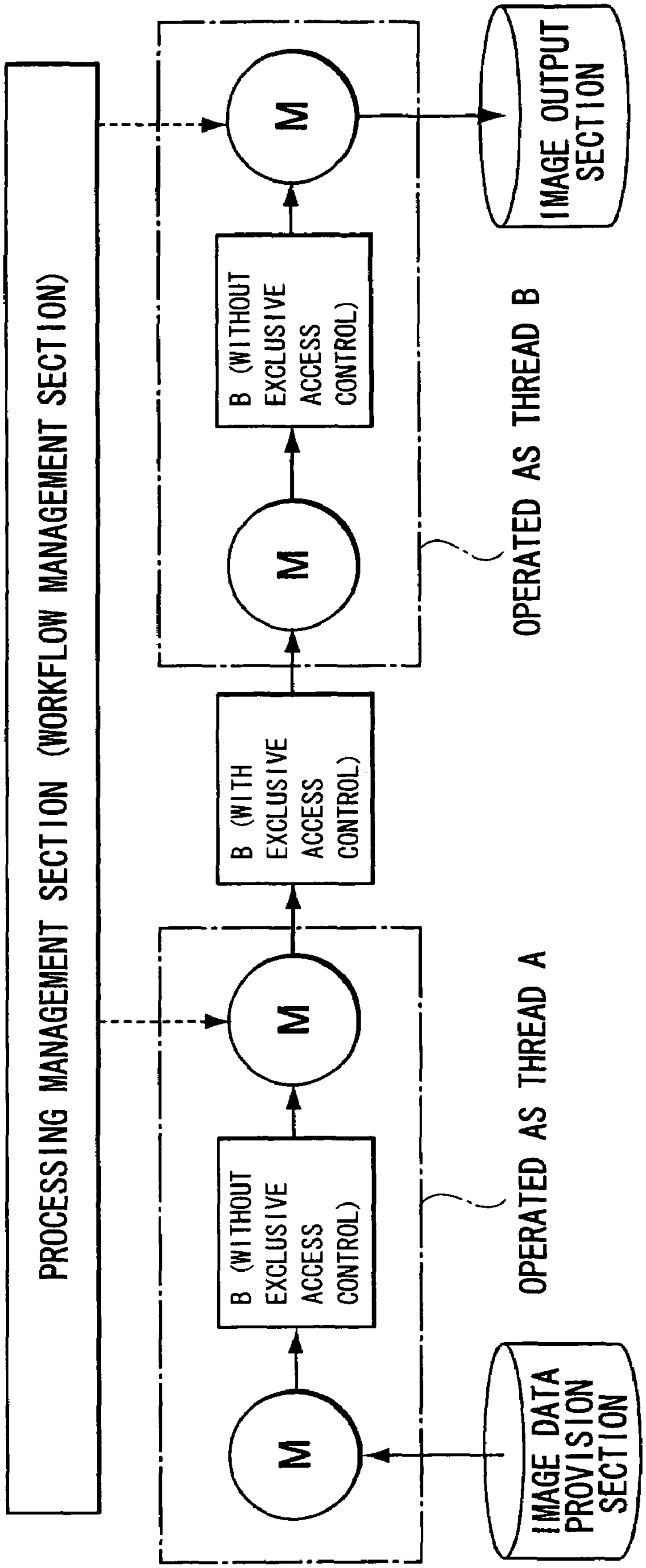
FIG. 15 is a block diagram showing another example of formulation of the image processing section.

In the above descriptions, a mode has been described in which, when the image processing section 50 is operated in a parallel processing system, the programs of the individual modules of the image processing section 50 are executed as mutually independent threads. However, this is not a limitation. The programs of the individual modules structuring the image processing section 50 may be executed as threads corresponding to respective pluralities of modules. FIG. 15 is a structure in which four of the image processing modules 38, and the buffer modules 40 provided between the image processing modules 38, are connected in a pipeline form. This structure illustrates an example in which the image processing modules 38 at the first stage and the second stage and the buffer module 40 provided therebetween are caused to execute as a thread A, and the image processing modules 38 of the third stage and the last stage and the buffer module 40 provided therebetween are caused to execute as a thread B in parallel with thread A. Such a case is possible if the buffer module 40 provided between the first stage image processing module 38 and the second stage image processing module 38, which operate sequentially, and the buffer module 40 provided between the third stage image processing module 38 and the last stage image processing module 38, which similarly operate sequentially, are buffer modules 40 without exclusive access control, while the buffer module 40 provided between the second stage image processing module 38 and the third stage image processing module 38, which operate in parallel, is a buffer module 40 with exclusive access control.

Further, in the above descriptions, a mode has been described in which single respective image processing section programs which serve as the parallel processing management section and the sequential processing management section are registered in the processing management section library 47. However, this is not a limitation. It is also possible to form a structure so as to select a single parallel processing management section from among plural parallel processing management sections or a single sequential processing management section from among plural sequential processing management sections in accordance with the operating environment of the image processing section 50 or the like. For example, if a number of program execution resources (for example, the CPU 12 and the like) is one, image processing can be performed with a sequential processing system at the image processing section 50 by selecting a sequential processing management section. If the number of program execution resources is two or more but is less than the number of image processing modules 38 structuring the image processing section 50, a parallel processing management section with which image processing is carried out by a parallel processing system such as that shown in FIG. 15 at the image processing section 50 (parallel processing in which a number of threads is restrained) may be selected. If the number of program execution resources is more than two and is more than the number of image processing modules 38 structuring the image processing section 50, a parallel processing management section with which image processing is performed at the image processing section 50 with a parallel processing system in which the programs of the individual modules of the image processing section 50 are mutually separate threads may be selected.

With a parallel processing system in which the programs of the individual modules of the image processing section 50 are executed as mutually separate threads, the possibility of efficient functioning is higher if the number of program execution resources is close to the number of image processing modules. Therefore, if [number of program execution resources÷number of image processing modules] is greater than a threshold value (for example, 0.8 or the like), a parallel processing management section with which image processing is executed in the image processing section 50 by a parallel processing system which executes the programs of the individual modules of the image processing section 50 as mutually separate threads may be selected.

Further again, the programs of the processing management sections 46 are not necessarily fixedly stored in the processing management section library 47 of the storage section 20. It is also possible to add a new processing management section program (for a parallel processing management section or a sequential processing management section) from outside the computer 10, via an external memory device such as, for example, a USB memory or the like or via a communications circuit or the like, or to overwrite a previously registered processing management section program to update to the new processing management section program. Altering techniques for optimum parallelization in accordance with the deployment of a new architecture at the CPU 12 or the like can also be considered. Furthermore, there are also cases in which initially providing an optimum processing management section program is difficult, and there is a possibility of subsequently developing a new algorithm with higher efficiency than the algorithm of an original processing management section program. In consideration of such cases, the processing management section library 47 of the storage section 20 may be structured to be capable of adding new processing management section programs, overwriting with updates of the same and the like.

Further still, it is also possible to initially provide, for example, only a processing management section for sequential processing (a sequential processing management section). Hence, for a user who wishes to increase the speed of image processing by causing parallel processing to be performed by the image processing section 50, a processing management section program update for adding a new processing management section program may be enabled in return for payment of an additional fee, or the like. It is also possible to enable processing management section program updates at certain intervals in accordance with maintenance contracts which have been concluded with users.

Further yet, in the above descriptions, a mode has been described in which the image processing program group 34 corresponding to the image processing program relating to the exemplary embodiment is stored (installed) in advance at the storage section 20. However, it is also possible to provide the image processing program relating to the exemplary embodiment in a form which is recorded at a storage medium such as a CD-ROM, a DVD-ROM or the like.

The foregoing description of the exemplary embodiments of the present invention has been provided for the purpose of illustration and description. It is not intended to be exhaustive or to limit the invention to the precise form disclosed herein. Obviously, many modifications and variations will be apparent to a practitioner skilled in the art. The exemplary embodiments were chosen and described in order to best explain the principles of the invention and its practical applications, thereby enabling others skilled in the art to understand the invention according to various embodiments and with various modifications as are suited to the particular use contemplated. It is intended that the scope of the invention be defined by the following claims and their equivalents.

What is claimed is:

1. An image processing device comprising:

a storage section that respectively stores programs of a plurality of types of image processing module, the programs each functioning as an image processing module that acquires image data from a preceding stage, carries out predetermined image processing on the image data and outputs to a following stage processed image data or a result of the processing, and the programs being different from one another in type or contents of the image processing;

a parallel processing control section that selects at least one image processing module from the plurality of types of image processing module, formulates a first image processing section such that first buffer modules are connected preceding and/or following the selected image processing module(s), the modules being connected in a pipeline form or a directed acyclic graph form, and performs control such that image processing is carried out mutually in parallel by the respective image processing modules of the first image processing section, each first buffer module allowing writing of image data outputted from a preceding module to a buffer of the buffer module, allowing reading of the image data stored in the buffer by a following module, and performing exclusive access control with respect to access to the buffer;

a sequential processing control section that selects at least one image processing module from the plurality of types of image processing module, formulates a second image processing section such that second buffer modules are connected preceding and/or following the selected image processing modules, the modules being connected in a pipeline form or a directed acyclic graph form, and performs control such that image processing is sequentially carried out by the individual image processing modules of the second image processing section, each second buffer module allowing writing of image data outputted from a preceding module to a buffer of the buffer module, allowing reading of the image data stored in the buffer by a following module, and not performing exclusive access control with respect to access to the buffer; and a selection section that selectively operates the parallel processing control section or the sequential processing control section, and causes image processing to be carried out on the image data of a processing object by the first image processing section or the second image processing section.

2. The image processing device of claim 1, wherein the storage section further stores each of a program of the first buffer modules and a program of the second buffer modules, the parallel processing control section uses the program of the first buffer modules for formulating the first image processing section, and the sequential processing control section uses the program of the second buffer modules for formulating the second image processing section.

3. The image processing device of claim 1, wherein each image processing module is structured such that, each time when an instruction for execution of image processing is inputted, the image processing module acquires a predetermined amount of image data from a preceding stage, carries out predetermined image processing on the image data and outputs processed image data or a result of the processing to a following stage, the parallel processing control section causes the image processing module programs of some or all of the image processing modules structuring the first image processing section to be executed by a program execution resource as mutually separate execution unit programs, and inputs image processing execution instructions to the individual image processing modules such that image processing is carried out mutually in parallel by the individual image processing modules, and the sequential processing control section causes the programs of the image processing modules structuring the second image processing section to be executed by the program execution resource with a plurality of the image processing module programs serving as an execution unit program, and inputs image processing execution instructions to the individual image processing modules such that image processing is carried out sequentially by the individual image processing modules.

4. The image processing device of claim 1, wherein the parallel processing control section comprises at least one of:

a first parallel processing control section that causes the programs of the individual image processing modules structuring the first image processing section to be executed by a program execution resource as mutually separate execution unit programs, and sets fixed execution priorities of the individual execution unit programs; or a second parallel processing control section that causes the programs of the individual image processing modules structuring the first image processing section to be executed by the program execution resource as mutually separate execution unit programs, and alters execution priorities of the individual execution unit programs in accordance with a degree of progress of image processing in the first image processing section.

5. The image processing device of claim 1, wherein each image processing module is structured such that, each time when an instruction for execution of image processing is inputted, the image processing module acquires a predetermined amount of image data from a preceding stage, carries out predetermined image processing on the image data and outputs processed image data or a result of the processing to a following stage, and the sequential processing control section comprises at least one of:

a first sequential processing control section that inputs image processing execution instructions such that image processing of image data of the processing object for a predetermined amount of image data is sequentially carried out in the image processing modules structuring the second image processing section from the image processing module at a preceding side of the pipeline form or directed acyclic graph form and processing is repeated until image processing of all the image data of the processing object is completed; and a second sequential processing control section that performs repeated input of image processing execution instructions to a particular image processing module of the image processing modules structuring the second image processing section, sequentially from an image processing module at the preceding side of the pipeline form or directed acyclic graph form, until image processing of all of the image data of the processing object by the particular image processing module has been completed.

6. The image processing device of claim 1, wherein the parallel processing control section and the sequential processing control section each comprises an error management section that performs predetermined processing each time when a notification of status is inputted from an execution unit program of the first image processing section or second image processing section, and that manages the status of the first image processing section or second image processing section, the error management section of the parallel processing control section processing the notifications of status that are inputted from execution unit programs of the first image processing section with exclusion and, when a notification of status notifying occurrence of an error is inputted, stopping execution of execution unit programs other than the source execution unit program of the error occurrence notification.

7. The image processing device of claim 1, wherein the selection section selects whether to operate the parallel processing control section or operate the sequential processing control section on the basis of a selection result or a selection condition inputted in advance by a user.

8. The image processing device of claim 1, wherein the selection section selects whether to operate the parallel processing control section or operate the sequential processing control section in accordance with an environment in which the first image processing section or second image processing section is to operate.

9. The image processing device of claim 8, wherein the selection section selects whether to operate the parallel processing control section or operate the sequential processing control section in accordance with the environment in which the first image processing section or second image processing section is to operate, the environment including at least one of (a) a number of program execution resources for executing the programs of the modules structuring the first image processing section or second image processing section, or (b) a number of the image processing modules structuring the first image processing section or second image processing section.

10. The image processing device of claim 1, wherein the storage section respectively stores a program of the parallel processing control section and a program of the sequential processing control section, and is capable of storing a new program that is inputted from outside of the parallel processing control section and/or the sequential processing control section by at least one of adding the new program and overwriting the previously stored program, and the selection section selects a processing control section to be operated from among all parallel processing control sections and all sequential processing control sections for which programs are stored in the storage section.

11. A method for operating an image processing device, comprising:

storing programs of a plurality of types of image processing module, the programs each functioning as an image processing module that acquires image data from a preceding stage, carries out predetermined image processing on the image data and outputs processed image data or a result of the processing to a following stage, and the programs being different from one another in type or contents of the image processing;

performing parallel processing control including selecting at least one image processing module from the plurality of types of image processing module, formulating a first image processing section such that first buffer modules are connected preceding and/or following the individual selected image processing modules, the modules being connected in a pipeline form or a directed acyclic graph form, and controlling such that image processing is carried out mutually in parallel by the individual image processing modules of the first image processing section, each first buffer module allowing writing of image data outputted from a preceding module to a buffer of the buffer module, allowing reading of the image data stored in the buffer by a following module, and performing exclusive access control with respect to access to the buffer;

performing sequential processing control including selecting at least one image processing module from the plurality of types of image processing module, formulating a second image processing section such that second buffer modules are connected preceding and/or following the individual selected image processing modules, the modules being connected in a pipeline form or a directed acyclic graph form, and controlling such that image processing is sequentially carried out by the individual image processing modules of the second image processing section, each second buffer module allowing writing of image data outputted from a preceding module to a buffer of the buffer module, allowing reading of the image data stored in the buffer by a following module, and not performing exclusive access control with respect to access to the buffer; and selectively operating the parallel processing control or the sequential processing control, and causing image processing to be carried out on the image data of a processing object by the first image processing section or the second image processing section.

12. The image processing method of claim 11, further comprising storing each of a program of the first buffer modules and a program of the second buffer modules, wherein the parallel processing control uses the program of the first buffer modules for formulating the first image processing section, and the sequential processing control uses the program of the second buffer modules for formulating the second image processing section.

13. The image processing method of claim 11, wherein each image processing module is structured such that, each time when an instruction for execution of image processing is inputted, the image processing module acquires a predetermined amount of image data from a preceding stage, carries out predetermined image processing on the image data and outputs processed image data or a result of the processing to a following stage, the parallel processing control causes the image processing module programs of some or all of the image processing modules structuring the first image processing section to be executed by a program execution resource as mutually separate execution unit programs, and inputs image processing execution instructions to the individual image processing modules such that image processing is carried out mutually in parallel by the individual image processing modules, and the sequential processing control causes the programs of the image processing modules structuring the second image processing section to be executed by the program execution resource with a plurality of the image processing module programs serving as an execution unit program, and inputs image processing execution instructions to the individual image processing modules such that image processing is carried out sequentially by the individual image processing modules.

14. The image processing method of claim 11, wherein the parallel processing control performs at least one of:

first parallel processing control, including causing the programs of the individual image processing modules structuring the first image processing section to be executed by a program execution resource as mutually separate execution unit programs, and setting fixed execution priorities of the individual execution unit programs; or second parallel processing control, including causing the programs of the individual image processing modules structuring the first image processing section to be executed by the program execution resource as mutually separate execution unit programs, and altering execution priorities of the individual execution unit programs in accordance with a degree of progress of image processing in the first image processing section.

15. The image processing method of claim 11, wherein each image processing module is structured such that, each time when an instruction for execution of image processing is inputted, acquires a predetermined amount of image data from a preceding stage, carries out predetermined image processing on the image data and outputs processed image data or a result of the processing to a following stage, and the sequential processing control performs at least one of:

first sequential processing control, including inputting image processing execution instructions such that image processing of image data of the processing object for a predetermined amount of image data is sequentially carried out in the image processing modules structuring the second image processing section from the image processing module at a preceding side of the pipeline form or directed acyclic graph form and processing is repeated until image processing of all the image data of the processing object is completed; and second sequential processing control including performing repeated input of image processing execution instructions to a particular image processing module of the image processing modules structuring the second image processing section, sequentially from an image processing module at the preceding side of the pipeline form or directed acyclic graph form, until image processing of all of the image data of the processing object by the particular image processing module has been completed.

16. The image processing method of claim 11, wherein the parallel processing control and the sequential processing control each further comprises performing predetermined processing each time a notification of status is inputted from an execution unit program of the first image processing section or second image processing section for managing the status of the first image processing section or second image processing section, the status management of the parallel processing control processing the notifications of status that are inputted from execution unit programs of the first image processing section with exclusion and, when a notification of status notifying occurrence of an error is inputted, stopping execution of execution unit programs other than the source execution unit program of the error occurrence notification.

17. The image processing method of claim 11, wherein the selectively operating comprises selecting whether to perform parallel processing control or perform sequential processing control on the basis of a selection result or a selection condition inputted in advance by a user.

18. The image processing method of claim 11, wherein the selectively operating comprises selecting whether to perform parallel processing control or perform sequential processing control in accordance with an environment in which the first image processing section or second image processing section is to operate.

19. The image processing method of claim 18, wherein the selectively operating selects whether to perform parallel processing control or perform sequential processing control in accordance with the environment in which the first image processing section or second image processing section is to operate, the environment including at least one of (a) a number of program execution resources for executing the programs of the modules structuring the first image processing section or second image processing section, or (b) a number of the image processing modules structuring the first image processing section or second image processing section.

20. The image processing method of claim 11, further comprising:

respectively storing a program of the parallel processing control and a program of the sequential processing control, and storing a new program that is inputted from outside of one of the parallel processing control and/or the sequential processing control by at least one of adding the new program and overwriting the previously stored program, wherein the selectively operating selects processing control to be executed from among all programs of parallel processing control and sequential processing control that have been stored.

21. A storage medium storing a program executable by a computer to perform image processing, the computer being provided with a storage section at which programs of a plurality of types of image processing module are respectively stored, the programs of the image processing modules each functioning as an image processing module that acquires image data from a preceding stage, carries out predetermined image processing on the image data and outputs to a following stage processed image data or a result of the processing, and the programs being different from one another in type or contents of the image processing, the image processing comprising:

parallel processing control, including selecting at least one image processing module from the plurality of types of image processing module, formulating a first image processing section such that first buffer modules are connected preceding and/or following the selected image processing module(s), the modules being connected in a pipeline form or a directed acyclic graph form, and controlling such that image processing is carried out mutually in parallel by the respective image processing modules of the first image processing section, each first buffer module allowing writing of image data outputted from a preceding module to a buffer of the buffer module, allowing reading of the image data stored in the buffer by a following module, and performing exclusive access control with respect to access to the buffer;

sequential processing control, including selecting at least one image processing module from the plurality of types of image processing module, formulating a second image processing section such that second buffer modules are connected preceding and/or following the selected image processing modules, the modules being connected in a pipeline form or a directed acyclic graph form, and controlling such that image processing is sequentially carried out by the individual image processing modules of the second image processing section, each second buffer module allowing writing image data outputted from a preceding module to a buffer of the buffer module, allowing reading of the image data stored in the buffer by a following module, and not performing exclusive access control with respect to access to the buffer; and selection processing including selectively operating the parallel processing control or the sequential processing control, and causing image processing to be carried out on the image data of a processing object by the first image processing section or the second image processing section.

* * * * *